(12) United States Patent
Gonzales et al.

(10) Patent No.: US 8,904,014 B2
(45) Date of Patent: Dec. 2, 2014

(54) CONTENT DELIVERY MECHANISMS FOR MULTICAST COMMUNICATION

(75) Inventors: Cesar A. Gonzales, Katonah, NY (US); Sumedh W. Sathaye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/421,418

(22) Filed: Mar. 15, 2012

(65) Prior Publication Data

US 2013/0246631 A1 Sep. 19, 2013

(51) Int. Cl.
G06F 15/16 (2006.01)
(52) U.S. Cl.
USPC .......................................... 709/227
(58) Field of Classification Search
USPC ............................. 709/227, 231, 232
See application file for complete search history.

(56) References Cited

U.S. PATENT DOCUMENTS

| | | | |
|---|---|---|---|
| 6,057,847 A | 5/2000 | Jenkins | |
| 6,516,350 B1 | 2/2003 | Lumelsky et al. | |
| 6,785,704 B1 | 8/2004 | McCanne | |
| 7,133,922 B1 | 11/2006 | She et al. | |
| 7,430,222 B2 | 9/2008 | Green et al. | |
| 7,467,400 B1 | 12/2008 | Moss et al. | |
| 7,577,667 B2 | 8/2009 | Hinshaw et al. | |
| 7,734,730 B2 | 6/2010 | McCanne | |
| 2001/0052008 A1 | 12/2001 | Jacobus | |
| 2001/0054104 A1 | 12/2001 | Bolosky et al. | |
| 2002/0019843 A1 | 2/2002 | Killian et al. | |
| 2004/0148420 A1 | 7/2004 | Hinshaw et al. | |
| 2005/0010653 A1 | 1/2005 | McCanne | |
| 2005/0076099 A1 | 4/2005 | Wang et al. | |
| 2005/0148325 A1 | 7/2005 | Kopra et al. | |
| 2005/0289618 A1 | 12/2005 | Hardin | |
| 2006/0067260 A1 | 3/2006 | Tokkonen et al. | |
| 2007/0107025 A1 | 5/2007 | Li et al. | |
| 2007/0143807 A1 | 6/2007 | Suneya | |
| 2007/0220575 A1 | 9/2007 | Cooper et al. | |

(Continued)

FOREIGN PATENT DOCUMENTS

| | | |
|---|---|---|
| EP | 1892892 A1 | 2/2008 |
| EP | 1921824 A1 | 5/2008 |

OTHER PUBLICATIONS

Qumu VideoNet, http://www.qumu.com/assets/pdf/datasheets/QumuVideoEdge.pdf.

(Continued)

Primary Examiner — Hee Soo Kim
(74) Attorney, Agent, or Firm — Thomas Grzesik; Fleit Gibbons Gutman Bongini & Bianco PL

(57) ABSTRACT

Content delivery by a network node in a network is optimized. The network node is communicatively coupled between multiple client devices and at least one content service provider. A media streaming service provided by a content service provider is received at the network node over a first unicast link. The service is transmitted from the network node to a first requestor device via a second unicast link. A request from a second requestor device for the service is intercepted by the network node. If it is determined that a multicast optimization threshold has been reached and/or exceeded, the service is transmitted from the network node to the first and second requestor devices using a single multicast link, while the service is received from the content service provider over the first unicast link.

22 Claims, 14 Drawing Sheets

(56) References Cited

U.S. PATENT DOCUMENTS

| | | | |
|---|---|---|---|
| 2008/0095163 A1* | 4/2008 | Chen et al. | 370/392 |
| 2008/0151807 A1 | 6/2008 | Meier et al. | |
| 2009/0070844 A1 | 3/2009 | Beer et al. | |
| 2009/0164287 A1 | 6/2009 | Kies et al. | |
| 2009/0254673 A1 | 10/2009 | Philyaw et al. | |
| 2009/0279468 A1* | 11/2009 | Kenagy | 370/312 |
| 2010/0138646 A1 | 6/2010 | Aloni et al. | |
| 2010/0296427 A1 | 11/2010 | Lohr et al. | |
| 2011/0131619 A1 | 6/2011 | Hasek et al. | |
| 2013/0246631 A1 | 9/2013 | Gonzales et al. | |

OTHER PUBLICATIONS

Content Delivery Networks (CDN) for Live TV Streaming, White Paper, Montama, pp. 1-8, 2011.

BurstPoint corporate brochure, http://www.burstpoint.com/downloads/burstpoint_corporate_brochure.pdf.

Akamai Media Delivery Streaming, http://www.akamai.com/dl/feature_sheets/Akamai_media_streaming.pdf.

Bakhuizen, Martin, et al., Ericsson Research, "Mobile Broadcast/Multicast in Mobile Networks", http://www.ericsson.com/ericsson/corpinfo/publications/review/2005_01/files/2005015.pdf.

RJ Vale, "eMBMS for More Efficient Use of Spectrum", TechZine Home, http://www2.alcatel-lucent.com/blogs/techzine/2011/embms-for-more-efficient-use-of-spectrum/.

Tom Bachert, SANS Institute 2002, "IPv4 Multicast Security: A Network Perspective", http://www.sans.org/reading_room/whitepapers/networkdevs/ipv4-multicast-security-network-perspective_246.

Marc Brogle, "Application Layer Multicast", RVS Seminar HS08, Oct. 22, 2008, http://cds.unibe.ch/teaching/hs08_seminar/seminar_hs08_brogle.pdf.

Technical Specification, 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 11), 3GPP TS 36.300 V11.0.0 (Dec. 2011).

International Search Report and written opinion dated May 30, 2013 for Application No. PCT/US13/30934.

Non Final Office Action dated Oct. 7, 2013 for U.S Appl. No. 13/421,371.

\* cited by examiner

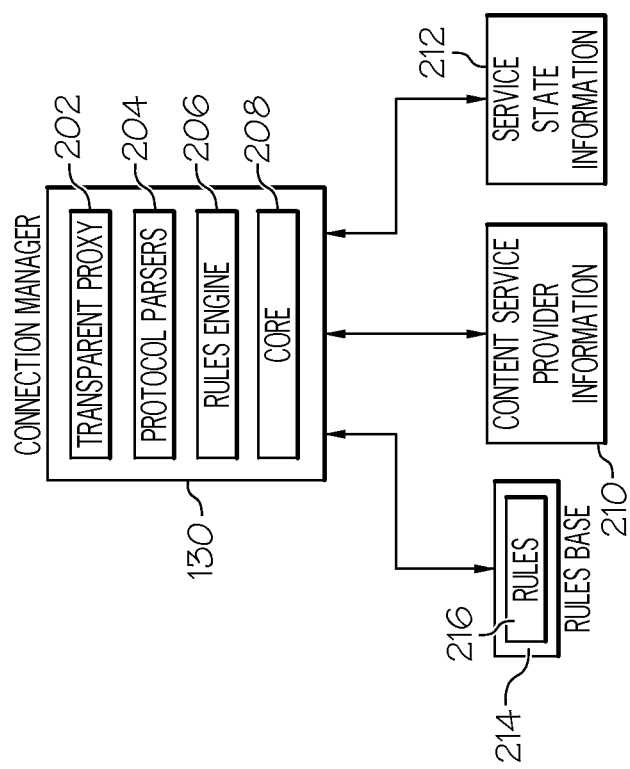

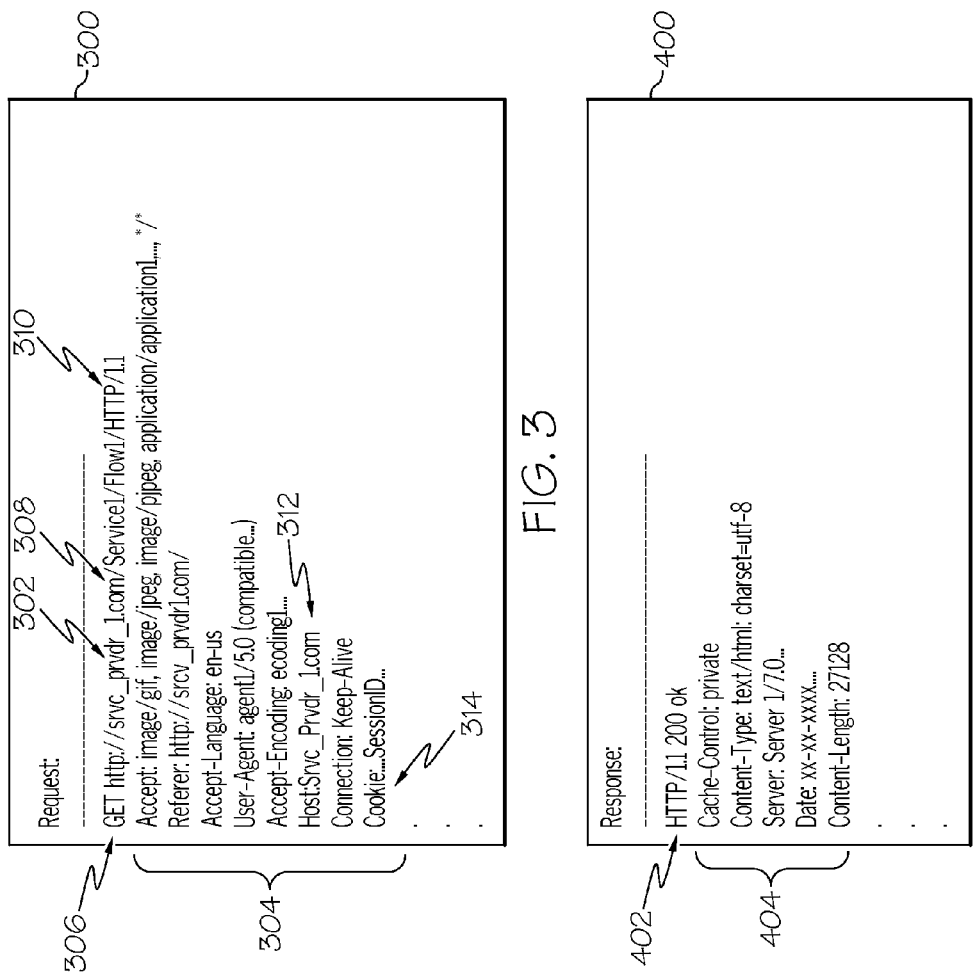

| SERVICE PROVIDER ID 502 | SERVICE PROVIDER NAME 506 | SERVICE PROVIDER URL 510 | RULE SET ID 514 | OPTIMIZATION STATUS 518 | ... |
|---|---|---|---|---|---|
| Srvc_1 | Srvc_Prvdr_1 | Srvc_Prvdr_1.com | RS_1 | Enabled | ... |
| Srvc_2 504 | Srvc_Prvdr_2 508 | Srvc_Prvdr_3.net 512 | RS_2 516 | Enabled 520 | ... |
| Srvc_3 | Srvc_Prvdr_3 | Srvc_Prvdr_3.tv | RS_3 | Disabled 522 | ... |
| ... | ... | ... | ... | ... | ... |
| Srvc_N | Srvc_Prvdr_N | Srvc_Prvdr_N.com | RS_N | N/A | ... |

CONTENT DELIVERY MECHANISMS FOR MULTICAST COMMUNICATION

CROSS-REFERENCE TO RELATED APPLICATIONS

This application is related to application "Connection Management and Optimization for Services Delivered Over Networks", Ser. No. 13/421,371, which was filed on the same day as the present application and is commonly assigned herewith to International Business Machines Corporation. This related application is herein incorporated by reference.

BACKGROUND

Embodiments of the present invention generally relate to networking, and more particularly relate to content delivery mechanisms for wireless communications networks.

Devices and links in a wireless communications network have specific capacity constraints. In particular, a link can carry a certain limited amount of information per unit of time. The limit is often dictated by physical properties of the link, and also by the link control elements (hardware and software) of the network. When a link is utilized to capacity, it cannot accept any requests to deliver more information. This situation occurs, for example, when a link is carrying the traffic of a number of users and no more resources are available for new user service requests. In this situation, the link control elements generally need to either: (1) drop current users to accommodate new requesters, (2) reduce the amount of information being carried for each user in order to free up capacity to accommodate new requesters, or (3) deny service to new requestors. These options are often not desirable because they may result in unsatisfactory quality of experience to users.

BRIEF SUMMARY

In one embodiment, a method is provided for optimizing content delivery in a wireless communications network. The wireless communications network includes a network node communicatively coupled between multiple client devices and at least one content service provider. According to the method, a media streaming service from a content service provider is received at the network node over a first unicast link. The media streaming service is transmitted from the network node to a first requestor device using a second unicast link. A request for the media streaming service is intercepted at the network node from a second requestor device. If the network node determines that a multicast optimization threshold has been reached and/or exceeded, the media streaming service is transmitted from the network node to the first requestor device and the second requestor device using a single multicast link, while the media streaming service is being received from the content service provider over the first unicast link.

In another embodiment, an information processing system is provided for optimizing content delivery in a wireless communications network. The information processing system comprises a memory and a processor that is communicatively coupled to the memory. A connection manager is communicatively coupled to the memory and the processor. The communication manager is configured to perform a method comprising receiving a media streaming service from a content service provider over a first unicast link. The media streaming service is transmitted to a first requestor device using a second unicast link. A request for the media streaming service is intercepted from a second requestor device. If the connection manager determines that a multicast optimization threshold has been reached and/or exceeded, the media streaming service is transmitted to the first requestor device and the second requestor device using a single multicast link, while the media streaming service is being received from the content service provider over the first unicast link.

In yet another embodiment, a computer program product is provided. The computer program product tangibly embodies computer readable non-transitory instructions. When the computer readable non-transitory instructions are implemented they cause a computer to carry out the steps of a method for optimizing content delivery in a wireless communications network. According to the method, a media streaming service from a content service provider is received at the network node over a first unicast link. The media streaming service is transmitted from the network node to a first requestor device using a second unicast link. A request for the media streaming service is intercepted at the network node from a second requestor device. If the network node determines that a multicast optimization threshold has been reached and/or exceeded, the media streaming service is transmitted from the network node to the first requestor device and the second requestor device using a single multicast link, while the media streaming service is being received from the content service provider over the first unicast link.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a block diagram illustrating a connection manager according to one embodiment of the present invention;

FIG. 3 illustrates an exemplary Hyper Text Transmission Protocol request message according to one embodiment of the present invention;

FIG. 4 illustrates an exemplary Hyper Text Transmission Protocol response message according to one embodiment of the present invention;

FIG. 5 shows content service provider information maintained by the connection manager of FIG. 2 according to one embodiment of the present invention;

DETAILED DESCRIPTION

As described below, embodiments of the present invention optimize delivery of media streaming services and their content streams in a programmable manner, via rules or policies defined for each service. This optimized delivery provides media streaming services and their content to requesting devices using a single multicast channel over the air interface of a wireless communications network using a single unicast link from the provider of the service. One exemplary embodiment provides for the separation of the basic building-blocks for abstracting of the functions required to identify opportunities for commonality in the streams, for replication of the streams when needed, and for delivery of replicated streams to end-clients in a transparent, secure manner using unicast methods. Further, the exemplary embodiment supports the use of multiple rule sets (one for each of the services supported) that are invoked, interpreted, and executed in a concurrent manner in a single instance of the apparatus. These rule sets can be enabled or disabled at run-time, under the control of an external network node/entity, a human operator, or both. This enablement and disablement turns on and off one or more functions in the rule sets. The exemplary embodiment also allows for multi-tenancy, in the form of simultaneous and concurrent delivery of independent content streams or services, on behalf of independent sets of service providers and end users, from a single instance of a connection manager.

Figure 1:
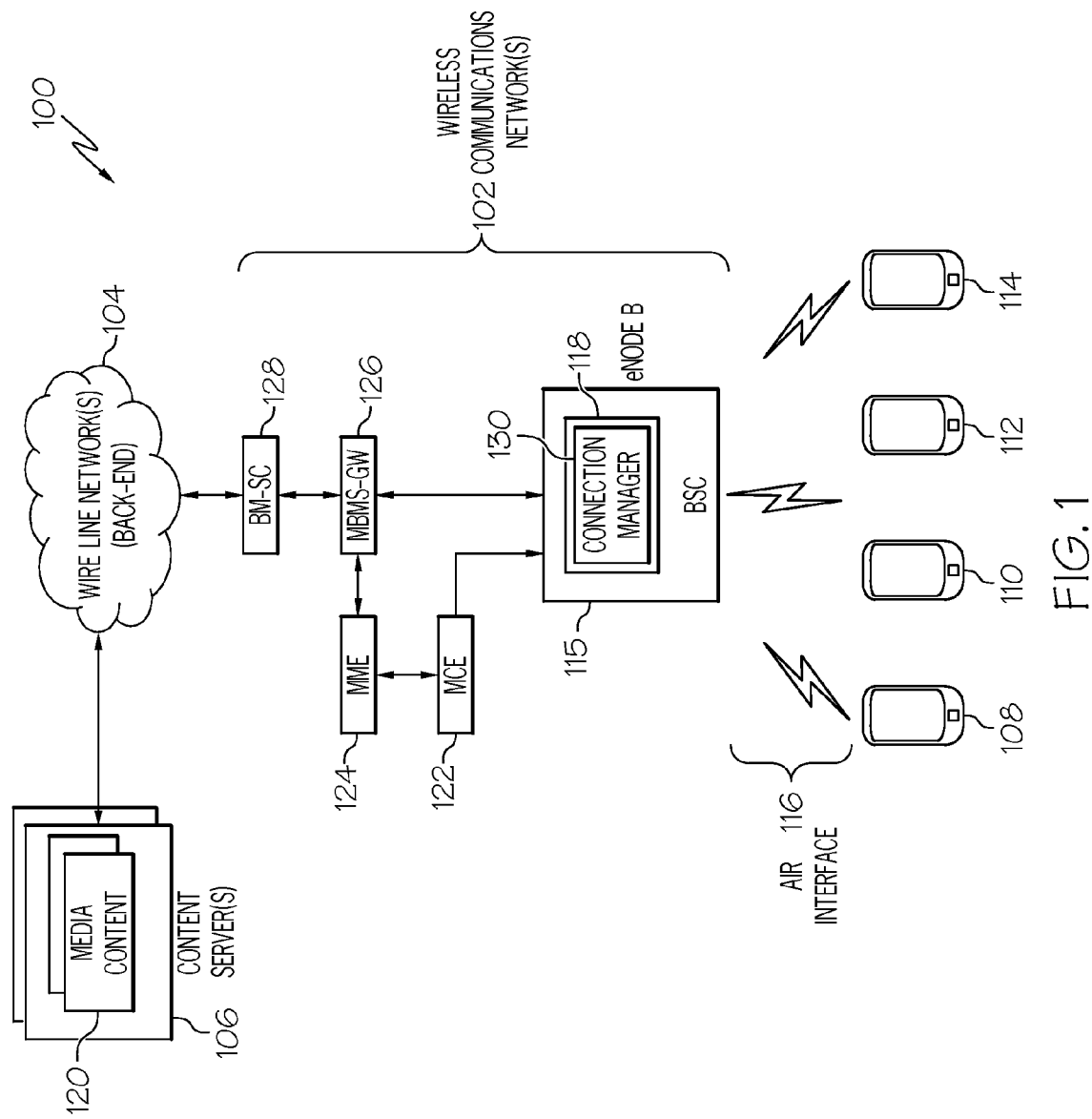
FIG. 1 is a block diagram illustrating an operating environment according to one embodiment of the present invention.

FIG. 1 shows an operating environment 100 according to one embodiment of the present invention. The operating environment 100 comprises one or more wireless communications networks 102 that are communicatively coupled to one or more wire line networks 104. For purposes of simplicity, only the portions of these networks that are relevant to embodiments of the present invention are described.

The wire line network 104 acts as a back-end for the wireless communications network 102. In this embodiment, the wire line network 104 comprises one or more access/core networks of the wireless communications network 102 and one or more Internet Protocol (IP) networks such as the Internet. The wire line network 104 communicatively couples one or more content sources/providers, such as content server(s) 106, to the wireless communications network 102. In further embodiments, the back-end is not a wire line network. For example, in one embodiment the back-end is a wireless network and takes the form of a point-to-point back-end network such as a directional microwave network used to transmit and receive signals bi-directionally. Alternatively, the back-end takes the form of a network of peers in which a mobile base station (e.g., eNode B in the case of GSM and its descendents) is itself used as a back-end network for other base stations.

The wireless communications network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communications network 102 includes one or more networks based on such standards. For example, in one embodiment, the wireless communications network 102 comprises one or more of a Long Term Evolution (LTE) network, an Evolution Data Only (EV-DO) network, a GPRS network, a Universal Mobile Telecommunications System (UMTS) network, and the like.

FIG. 1 further shows that one or more user devices 108-114 are communicatively coupled to the wireless communications network 102. The user devices 108-114, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. User devices 108-114 access the wireless communications network 104 through one or more transceiver nodes 115 using one or more air interfaces 116 established between the user devices 108-114 and the transceiver node 115.

In another embodiment, one or more user devices 108-114 access the wireless communications network 102 via a wired network and/or a non-cellular wireless network such as, but not limited to, a Wireless Fidelity (WiFi) network. For example, the user devices 108-114 can be communicatively coupled to one or more gateway devices via wired and/or wireless mechanisms that communicatively couples the user devices 108-114 to the wireless communications network 102. This gateway device(s), in this embodiment, communicates with the wireless communications network 102 via wired and/or wireless communication mechanisms.

A transceiver node 115 is known as a base transceiver station (BTS), a Node B, and/or an Evolved Node B (eNode B) depending on the technology being implemented within the wireless communications network 104. This exemplary embodiment relates to an LTE network, so the illustrated transceiver node 115 is an eNode B. Further embodiments of the present invention are used with other wireless communication technologies such as CDMA. The eNode B 115 is communicatively coupled to one or more antennas and a base station controller (BSC) 118, which manages and controls one or more eNode Bs 115. The BSC 118 can be included within or separate from the eNode B 115.

The user devices 108-114 interact with the wireless communications network 102 to send/receive voice and data communications to/from the wireless communications network 104. For example, the user devices 108-114 are able to wirelessly request and receive content streaming services from a provider, such as the content server 106, through the wireless communications network 102. The requested content/service is delivered to the wireless communications network 102 through the wire line network 104. In this exemplary embodiment, the content server 106 comprises media content 120 such as audio, video, and text that can be provided to user devices. Media content can either be live or pre-stored. Live media content is generated in real-time by a content service provider and captured by the content server 106. The content server 106 provides the live media content to requesting user devices.

Examples of live media content are video and audio of sporting events, news events, and so on that are provided by various content service providers.

Pre-stored media content is content that is not generated in real-time but instead has been previously generated/created and can be accessed at any point in time by user devices. Examples of pre-stored media content are movie files, audio files, and so on. In this embodiment, the content server hosts the pre-stored media content and is considered the content service provider because the user devices 108-114 request the content directly from the content server 106. However, in another embodiment, other servers host the pre-stored media content and are considered the content service providers. The content service providers send their content to the user devices 108-114 through the content server 106.

The media content 120 is provided to the user devices 108-114 via one or more media streaming services ("service" or "streaming service"), which provide one or more content streams to the user devices 108-114. Streaming refers to the process of continuously transmitting data from a source device (e.g., the content server) to a target device (e.g., a user device), with the target device processing the data as it is received. For example, a user device 108 is able to view portions of a video file as they are received from the content server 106 without having to first store the entire video file. Examples of streaming services are a real-time streaming service for providing a content stream comprising live audio/video to the user devices, an audio streaming service for providing a content stream comprising pre-stored audio media content to the user devices, and a movie streaming service for providing a content stream comprising pre-stored movie content to the user devices.

A user device 108 sends a request to the content server 106 through the wireless communications network 102 for specific media content 120, a specific service, or both. For example, a user device 108 can send a request to the content server 106 for a specific movie to be streamed to the device via a movie streaming service. As another example, the user device 108 can send a request for an audio streaming service, which streams various audio content items within the media content 120 to the device. While examples are given with respect to media streaming services requested by end user devices, embodiments of the present invention also apply to other types of data content requested by end user devices.

One mechanism that can be used to stream the media content 120 to the user devices 108-114 is a unicast transmission mechanism. Unicast transmission mechanisms send a separate instance of the media content 120 to each requesting user device 108-114 over a separate logical point-to-point connection/link between the content server 106 and each user device. To establish unicast links over the air interface 116, a separate channel of the mobile spectrum is allocated and used for each user device 108-114 that receives the stream. This produces inefficiencies when multiple user devices receive the same stream.

The wireless communications network 102 of this embodiment includes components for transmitting requested content/services utilizing one or more broadcast/multicast transmission mechanisms such as, but not limited to, a Multimedia Broadcast Multicast Service (MBMS) and an Evolved Multimedia Broadcast Multicast Service (eMBMS). As shown in FIG. 1, the wireless communications network 102 comprises an MCE (Multi-cell/multicast Coordination Entity) 122, an MME (Mobility Management Entity) 124, an MBMS-GW (Multimedia Broadcast Multicast Services Gateway) 126, and a BM-SC (Broadcast/Multicast Service Center) 128. These multicast components (MCE 122, MME 124, and BM-SC 128) are not used during unicast transmissions. While these multicast components are specific to the 3GPP (3G Partnership Project) set of standards, further embodiments of the present invention use similar or equivalent components/functions that exist for other types of mobile networks such as CDMA, or for other types of wireless non-cellular networks such as the Wi-Fi networks.

The MCE 122 is communicatively coupled to the MME 124 and the eNode B 115. In this embodiment, the MCE 122 resides outside of the eNode B 115, but in further embodiments is implemented within the eNode B 115. The MCE 122 is responsible for coordinating multi-cell MBMS transmissions. In particular, the MCE 122 allocates time and frequency resources for multi-cell MBMS transmissions and performs scheduling at the air interface 116. The MME 124 is communicatively coupled to the MCE 122 and the MBMS-GW 126. The MME 124 is responsible for packet-data switching and mobility/session management within the network 102. The MBMS-GW 126 is communicatively coupled to the MME 124 and the BM-SC 128. The MBMS-GW 126, among other things, acts as the entry point of incoming broadcast/multicast traffic and broadcasts received packets to all eNode Bs 115 within a service area. The BM-SC 128 acts as an entry point for broadcast/multicast sources (e.g., content providers such as the content server 106) that are external to the wireless communications network 102.

In broadcast mode, a unidirectional point-to-multipoint type of transmission is utilized to provide media content 120 from the content server 106 to all user devices 108-114 within a defined broadcast area. However, in a multicast mode, a user device 108 subscribes to a specific service and only receives content particular to that service. The multicast mode utilizes IP multicasting mechanisms to deliver the requested content/service from the content server 106 to the subscribed user devices over the air interface 116. This operation is logically similar to IP multicast delivery in a wired network. One advantage of utilizing a multicast transmission mechanism within the wireless communications network is that by extending multicast over the air, a single channel of the mobile delivery spectrum is utilized, instead of the separate channels that would be used in the unicast delivery method. Thus, spectrum utilization is improved.

Conventional multicasting within a wireless network 102 generally requires IP multicasting to be used within the access/core network of the wireless system for an end-to-end multicast transmission between the content server and the user devices. Such conventional IP multicasting has various drawbacks. For example, IP multicast networks are more likely to have network security issues, such as DoS (denial-of-service) attack points, due to the nature of multicast as compared to unicast networks. IP multicast is also prone to unreliable data delivery (e.g., packet drops that are not repairable) due to its use of the User Datagram Protocol (UDP). Another issue with using IP Multicast (which is a Layer 3 protocol set) is how well it maps to the underlying Layer 2 local-area network (LAN) elements. This mapping creates additional opportunities for DoS attacks and can also lead to packet flooding on local networks, reducing the effective use of local network resources. For such reasons, many organizations limit the use of IP Multicasting in their networks.

To overcome such drawbacks, this exemplary embodiment includes one or more connection managers 130 in the wireless communications network for optimizing the delivery of a content stream to multiple user devices 108-114. This optimization is performed by establishing a single unicast link between the connection manager 130 and the content server 106, and providing a requested media streaming service to multiple user devices 108-114 over the air interface 116 utilizing separate unicast links to each user device 108-114. Further optimization is provided by establishing multicast links over the air interface 116 while communicating with the content server 106 over a single unicast link.

The connection manager 130 is situated within the wireless communications network 102 such that content service requests from multiple requestor devices (requestors or clients), such as the user devices 108-114 and/or one or more other connection managers, are transparently transmitted through the connection manager 130 to the content server 106. It should be noted that the connection manager 130 is not limited to being situated within the wireless communications network 102. For example, the connection manager 130, in one embodiment, is situated within the gateway device(s) discussed above, which communicatively couples the user devices 108-114 to the wireless communications network 102 via wired and/or wireless communications mechanisms. In this embodiment, the connection manager(s) 130 at the gateway device(s) provides a requested service to multiple user devices 108-114 over wired and/or wireless multicast links while communicating with the content server 106 over a single wireless and/or wired unicast link through wireless communications network 102.

In addition, the connection manager 130 can be placed strategically at any point in a network where multiple branches occur. This provides the ability to serve multiple network branches while optimizing for redundancy. In one embodiment, the connection manager 130 is disposed within the BSC 118. In further embodiments, the connection manager 130 is disposed within the eNode B 115 itself, the MCE 122, and/or any other component/node of the wireless communications network that is between the eNode B 115 and the wire line network 104.

In some embodiments, multiple instances of the connection manager are implemented within the wireless communications network. In such embodiments, each instance of the connection manager 130 cooperates with other instances in a transparent manner to optimize for redundancy in content streams. Each instance of the connection manager 130 operates independently, optimizing content delivery either on behalf of end user devices or downstream connection manager instances. The connection manager 130 is configured so that independent threads of execution are created and launched on a per-connection basis. The state of each thread is manipulated independently, and the common shared objects within the service state information 212 are guarded for safe sharing across the entire stack of functional layers 202, 204, 206, and 208 of the connection manager 130. In further embodiments, the connection manager 130 is implemented in a non-multithreaded manner (i.e., in a single-threaded manner) in which case the safe-guarding of shared service state information is not required and is achieved using a combination of scheduling techniques for multiple connections being managed by the connection manager 130.

The connection manager 130 transparently intercepts requests for streaming services submitted by requestor devices to the content server 106. The connection manager 130 analyzes the requests from different entities to identify redundant requests (i.e., requests for the same streaming service from the same content service provider). The connection manager 130 utilizes one or more rule sets associated with the content service providers and their services to optimize the delivery of a service and its content to the multiple requestor devices. For example, when a first requestor sends a request for a content streaming service, a single unicast link is established between the connection manager 130 and the content server 106 through the wireless communications network 102 and wire line network 104. When the connection manager 130 detects that a subsequent requestor is requesting the same content streaming service, the connection manager 130 replicates the content stream provided by the service, which is already being received over the unicast link.

The connection manager 130, based on various rules, transmits the requested service to each of the requestor devices via a separate channel over the air interface 116, or by multicasting the requested service to the multiple requestor devices using a single channel over the air interface 116. Thus, only a single unicast link is established between the connection manager 130 and the content server 106 for a given media streaming service. The connection manager 130 is able to transmit the content streaming service being received over the single unicast link to multiple requestor devices over the air interface 116. When multicasting is used to provide the service to multiple requestor devices, IP multicast is not required to be enabled on the back-end wire line network 104. The connection manager 130 utilizes one or more multicast rule sets to set up, utilize, manage, and eventually tear-down a multicast group of requestor devices over the air interface 116. The multicast rule sets control and manage the eMBMS (or equivalent) parts of the wireless communications network 102, such as the MCE 122, the MCE 124, and the BM-SC 128, in cooperation with the eNode B 115. In addition, the connection manager 130 sets up and manages multicast groups for transmitting a requested service to multiple requestor devices.

FIG. 2 shows a connection manager 130 according to one embodiment of the present invention. In this embodiment, the connection manager 130 includes a transparent proxy module 202 and one or more protocol parsers 204. FIG. 2 also shows that the connection manager 130 includes and/or is communicatively coupled to content service provider information 210, service state information 212 including multicast information, and a rules base 214, which comprises one or more rules 216. The content service provider information 210 comprises information associated with each content service provider that has registered with the connection manager 130 for optimization. The service state information 212 comprises information associated with each individual service being optimized by the connection manager 130 along with associated multicast group information. The rules base 214 comprises rules 216 that are encoded as rule sets. In this embodiment, there are ground rule sets, service rule sets, and multicast service rule sets.

Ground rule sets are default rules that are not specific to any streaming service or content service provider. The ground rules are applied to a communication when it is first received and/or when a determination is made that optimization are not to be performed. Service rule sets comprise rules that are specific to a given streaming service and/or content service provider and are used by the connection manager 130 to optimize the delivery of streaming services and their content streams to multiple user devices. A service rule set for a given service (or content service provider) comprises service rules for requests received from requestor devices and service rules for responses received from content service providers.

Multicast rule sets are used to set up, utilize, manage, and eventually tear-down a multicast group of requestors over the air interface 116. Multicast rule sets can be associated with a single service, a content flow/stream of a service, or can be applied globally to all services registered for optimization. The multicast rule sets are configured to include actions performed by the connection manager 130 that trigger when a requestor is to join in the reception of a content streaming service that is already under optimization by the connection manager 130. One example of a trigger action is identifying the crossing of one or more threshold conditions, which can be included within the multicast rules or ground rules for multicast optimization. Examples of thresholds are the number of clients receiving a content streaming service being greater than a predefined or programmable parametric value, and spectrum channel resource limits being greater than a predefined or programmable parametric value.

In this embodiment, upon reaching a threshold, the rules trigger the following exemplary actions in the air interface 116 of the mobile communication network 102: 1) command the MCE 122 to set up and allocate radio channels for multicast of content streams in consideration, 2) create a new multicast group at the eNode B 114, 3) begin multicast transmission of the content streams to the multicasting group while still communicating with the actual content server at the service origin using a unicast transmission mechanism, 4) command requestor devices to join the multicast group, 5) tear down (e.g., disable/disconnect) pre-existing unicast connections with clients which were in use until the creation of the multicast group over the air interface and delivery of the content stream using multicast, and 6) retain and use the unicast connection to the content server 106.

Each rule set 216 is dedicated to optimizing the delivery of streaming services and their content streams comprising live or pre-stored media content 120. Each rule set 216 is an entity independent of the rest of the connection manager 130, and can be interpreted, compiled, built-in, or plugged in, at runtime, at compile-time, or both. The connection manager 130 provides complete flexibility to accommodate all forms and types of specification of rules for optimization of various services. Each rule set 216 comprises entry point methods that are invoked when the protocol parsers 204 detect matching patterns or events in the flow of requests and responses. For example, when an HTTP (Hyper Text Transmission Protocol) request is made by a requestor device, a rule that checks for the content of the "Host:" field is executed. This rule checks for occurrence of conditions such as existence of a certain hostname (e.g., Srvc_Prvdr_1.com).

When a match occurs, the core module 208 takes actions which create, manipulate, alter, or delete the service state information 212 based on the rule set(s) 216. The core module 208 is responsible for maintaining and managing the state of each client connection, roles of the clients and servers, the content buffers held in the system on behalf of the clients, and the state updates to each of these elements. While these actions performed by core module 208 result from the execution of the rules, the elements of the core module 208 are themselves independent of the rules that optimize a specific service.

The rule sets 216 are external to the connection manager 130, and are crafted outside of the connection manager 130. Therefore, the rule sets 216 describe the logic by which the connection manager 130 can take advantage of redundancy in requested services and their content streams, in a service-independent fashion. The rule sets 216 can be encoded in various ways, for example, in a high-level programming language (e.g., C, C++, Java) or in an interpreted language (e.g., JavaScript, Python). The rules engine 206 provides a unified interface for the inclusion of rule sets 126 specified by a variety of methods, and allows for service-independent manipulation of the service state information 212.

In addition, the rule sets can be supplied using an external management entity, such as a network manager. In this embodiment, an instance of the connection manager 130 is installed in the delivery network 104 without any rule-sets in the rule base 214. Then, at runtime, one or more sets of rules are downloaded in the instance, based on the business or other needs of the network operator, and/or of the operator's clients/customers. Further, in a similar manner, one or more rule sets already downloaded and installed in an instance of the connection manager 130 are modifiable, either partially or in entirety. This embodiment enables the operator to enable or disable the optimization of a streaming service, and optimize the bandwidth on-demand.

The rule sets can be designed in a hierarchical fashion. For example, a streaming service can be composed of high-level rules addressing the needs of the application layer of the service protocol. When that application layer protocol makes use of a standard lower level protocol, the rules of the lower level protocol can be specified as a low-level rule-set, to be invoked by the high-level rule-set. Therefore, hierarchical service composition is possible in order to enable optimization of streaming for such complex services. An example of this feature is a live Internet television streaming service using the low-level RTMP (real-time multimedia protocol) for delivery of live video streams.

The transparent proxy module 202 transparently intercepts communications (i.e., messages such as requests and responses) between requestor devices and the content server 106. The communications can be intercepted at Layer 2 (link level), Layer 3 (packet level), or layer 4 (transport level) and above of the Open System Interconnection (OSI) network model. In this exemplary embodiment, the proxy module 202 monitors for Internet protocol connection requests from requestor devices to the content server 106. FIGS. 3 and 4 show exemplary communications that are intercepted by the proxy module in one embodiment. In particular, FIG. 3 shows an HTTP request 300 received from a user device 108, and FIG. 4 shows a corresponding HTTP response message 400 received from the content server 106. The request 300 and response 400 shown in FIGS. 3 and 4 only include portions of a complete request and response ease of understanding. It should be noted that embodiments of the present invention are not limited to the HTTP protocol and are applicable to other link-layer, network-layer, or application-layer protocols as well.

The HTTP request message shown in FIG. 3 includes a request line 302 and a headers section 304. Other components such as a blank line and the message body are not shown in FIG. 3. The request line 302 comprises a method token 306 ("GET"), a request Uniform Resource Identifier 308 ("//srvc_prvdr_1.com/Service1/Flow1"), and an identifier 310 ("HTTP/1.1") identifying the version of HTTP being used. The method token 306 identifies the method to be performed on the resource identified by the request Uniform Resource Identifier (URI) 308. The request-URI 308 identifies the resource upon which the request is applied.

The header section 304 includes additional information about the request 300 and the user device 108 itself. The exemplary request 300 includes a "Host:" field 312 in the header section 304 that identifies the domain name of the server that provides the requested resource (e.g., service). Stated differently, the "Host:" field 312 identifies the content service provider ("srvc_prvdr_1.com) associated with the request 300. Another field under the header section 304 is the "Cookie:" field 314, which comprises state information from a cookie associated with the user device 108 and the content service provider. The state information includes a session identifier ("SessionID"), authentication information, user preferences, and the like.

A user device 108 can submit different types of requests depending on whether a request streaming service is a "pull" or "push" service. A "pull" service requires a user device to submit a content request whenever the device requires content. Therefore, a device sends a content request and non-content requests for a "pull" service. Non-content requests identify the requested service, the requested content flow/stream, and the like. A "push" service sends content to a user device without the need for the device to continually request the content. Therefore, with respect to a "push" service, the device only needs to send a request for establishing a connection with the service provider.

FIG. 4 shows a corresponding HTTP response message 400 for the HTTP request message 300 of FIG. 3. The HTTP response message 400 shown in FIG. 4 includes a response status line 402 and a header section 404. Other components such as a blank line and the message body are not shown in FIG. 4. The response status line 402 includes the protocol version "HTTP/1.1" followed by a numeric status code ("200") and its associated textual phrase ("OK"). The header section 404 of the response allows the server hosting the requested resource to pass additional information about the response 400 that cannot be placed in the response status line. These header fields in the header section give information about the server and about further access to the resource identified by the request-URI. A more detailed discussion on HTTP request and response messages is given in W3C Network Working Group's Request For Comments 2616 "Hypertext Transfer Protocol—HTTP/1.1", June 1999, which is herein incorporated by reference in its entirety.

Referring back to FIG. 2, the proxy module 202 is configured to identify the type of communication protocol being used in each intercepted message. For example, the proxy module 202 can determine whether a message is using HTTP, HTTPS (HTTP Secure protocol), RTMP (Real-Time Multimedia Protocol), etc. The proxy module 202 identifies the protocol type based on the communication port over which the message was transmitted, a template for each protocol that is compared to the message, or based on information within the message. Once the protocol associated with the message is identified, the proxy module 202 is able to invoke the appropriate protocol parser 204, via a programmatic interface, for interpreting the message.

In this embodiment, the connection manager 130 includes multiple parsers 204, one for each communication protocol (e.g. HTTP, HTTPS, RTMP, etc.) of interest. Each parser 204 is configured to process request messages and response messages separately. Also, each parser 204 is configured to process the state of each connection separately such that maximum benefit of task-level concurrency can be obtained. A parser 204 invokes the rules engine 206, via a programmatic interface, for processing the information identified within a response/request message by the parser 204. The programmatic interface provides execution points upon each entry point for request and response messages for each protocol parsed.

During each invocation of the rules engine 206 one or more rules are executed based upon the specific behavioral actions enumerated in a rule set 216 and upon matching of conditions. The execution of rules is carried out on behalf of a user device and can be independent of the other user devices, or may have a dependency on the actions and consequences of the other user devices. The rules engine 206 performs the task of enforcing and honoring all such dependencies.

The rules engine 206 utilizes the parser 204 to obtain information from the received message. The information obtained by the parser 204 is identified in the ground rules and/or the service rules of the rules base 214. As discussed above, the ground rules are not specific to any content service provider, but are default rules that are applied to a message when it is first received and/or when a determination is made that optimization is not to be performed. When a message such as a request or response is first received, the rules engine 206 applies a ground rule that indicates which portions of the message to parse for identifying the content service provider and/or service associated therewith. For example, a ground rule can indicate that information from the "Host:" field within an HTTP request is to be obtained by the parser 204. Using the request message 300 shown in FIG. 3, the parser 204 identifies the "Host:" field 312 within the request 300 and obtains the value of the field, which is "Srvc_Prvdr_1.com". The connection manager 130 uses this information to determine whether or not optimization is to be performed for delivering the associated content stream and its content.

In this embodiment, the rules engine 206 determines if optimization is to be performed for the requested service by determining if the information parsed from the request message 300 satisfies any conditions of any service rules within the rules base 214. For example, a service rule can include a condition such as "(requestheader[host].contains ("Srvc_Prvdr_1.com")". This condition indicates that the "Host:" field 312 within the header of the request message 300 needs to include the value of "Srvc_Prvdr_1.com" in order for one or more optimizations provided by the connection manager 130 to be initiated. Stated differently, the "Host:" field 312 needs to identify a given content service provider, such as "Srvc_Prvdr_1.com". Therefore, the rules engine 206 compares the "Host:" field value of "Srvc_Prvdr_1.com" obtained from the request message 300 shown in FIG. 3 to the value required by the above condition. In this example, the rules engine 206 determines that the "Host:" field value of "Srvc_Prvdr_1.com" obtained from the request message 300 satisfies the above condition. Therefore, the rules engine 206 determines that the service rule(s) comprising the satisfied condition is associated with the content service provider Srvc_Prvdr_1.com and is to be used for optimizing the delivery of the content stream of the requested service.

A similar process is applied to response messages 400 intercepted by the proxy module 202. For example, when a response message 400 from the content server 106 is received the proxy module 202 identifies the protocol associated with the response message 400. A parser 204 is invoked to obtain information from the message 400 as indicated by one or more ground rules and/or service rules. Based on these rules and the information within the message 400, the rules engine 206 determines the content service provider associated with the response 400, the service (and/or content) being provided in the response 400, and the like.

The service rules can also include conditions associated with the requested service. For example, a content service provider may provide more than one media service such as a video streaming service and an audio streaming service. Each of these services can provide multiple unique content streams such as different channels of live-video or different audio stations. In this embodiment, the content service provider may only want to have optimization performed for its video streaming service (or for a specific content stream). Therefore, the service rule associated with this content service provider can indicate that in addition to the "Host:" field 312 of the request 300 comprising a given value, the request-URI in the request line 302 of the message 300 also needs to comprise a given value. For example, the service rule can include a condition such as "(request.uri.contains("Service1/")", where "request-URI" identifies the service provided by the service provider for which optimization is to be performed.

The rules engine 206 performs a comparison process to determine if the information parsed from the request-URI in the request message 300 satisfies the above condition. Once the rules engine 206 determines that all conditions of the service rule have been satisfied, optimization can be initiated by the core module 208. If one or more conditions of an associated service rule are not satisfied by a request/response message, ground rules are checked to determine what action to take. In this embodiment, the request/response is passed on to the content server 106 or user device 108 without any optimization operations being performed. Unicast links between the connection manager 130 and the content server 106, as well as over the air interface 116, are used to provide each requestor device with a separate instance of the requested streaming service.

In another embodiment, the rules engine 206 is not required to search through all of the conditions within service rules to determine whether or not a given service rule applies to the content service provider associated with an intercepted message. For example, when a message is received by the proxy module 202, a ground rule can instruct the rules engine 206 to analyze the content service provider information 210 to determine if the content service provider associated with the received message is registered with the connection manager 130 for optimization. FIG. 5 shows one example of content service provider information 210. In particular, FIG. 5 shows a table 500 comprising a set of information for multiple content service providers that are registered with the connection manager 130 for optimization. Embodiments of the present invention are not limited to the information or columns shown in FIG. 5 (e.g., one or more columns can be added or deleted in the table). Also, the embodiments are not limited to the use of a table format for this information, and any other standard formats to arrange this information can be used.

In the example shown in FIG. 5 each row of the table is associated with a single content service provider, but other organization formats are applicable as well. As shown, the table has a first column 502 entitled "Service Provider ID". This column 502 comprises entries 504 including a unique identifier (ID) associated with each content service provider registered with the connection manager 130. This ID allows the connection manager 130 to distinguish the content service providers from each other and also to locate information associated therewith.

A second column 506 entitled "Service Provider Name" includes entries 508 identifying the name of a given content service provider. A third column 510 entitled "Service Provider URL" comprises entries 512 identifying a uniform resource location (URL) associated with a given content service provider. A fourth column 514 entitled "Rule Set ID" includes entries 516 with a unique identifier of each service rule set 216 associated with the given content service provider. A fifth column 518 entitled "Optimization State" includes entries 520 indicating whether or not the connection manager is to perform optimization for a given content service provider. The content service providers can dynamically enable or disable the optimization provided by the connection manager. If a content service provider is not configured for dynamically enabling or disabling the optimization, then an entry 522 under this column 518 indicates so.

As discussed above, the rules engine 206 determines if the content service provider associated with the received message is registered with the connection manager 130 by analyzing the content service provider information 500. For example, the rules engine 206 can compare the content service provider identifier "Srvc_Prvdr_1.com" parsed from the "Host:" field 312 of the request message 300 shown in FIG. 3 against the content service provider information shown in FIG. 5. If the content service provider identifier "Srvc_Prvdr_1.com" matches an entry within the content service provider identifier 500, then the rules engine determines that the content service provider "Srvc_Prvdr_1.com" is registered with the connection manager 130 for optimization. In this embodiment, the rules engine 206 further analyzes the "Optimization Status" column 518 to determine whether or not optimization is enabled or disabled for the given content service provider. In the current example, optimization for Srvc_Prvdr_1.com is enabled. The connection manager 130 also determines whether optimization is to be globally applied to all services provided by a service provider or to specific services (and/or specific content streams of a service) provided thereby. For example, a column can be used to list the specific service or content, such as Service1, for which optimization is to be applied. This column can also include entries that indicate that optimization is to be applied to all content/services provided by the service provider.

If the rules engine 206 determines that content delivery optimization is not to be performed for the media streaming service associated with the received message, the message is passed onto the content server 106 or the requestor device without any optimization operations being performed. Unicast links between the connection manager 130 and the content server 106, as well as over the air interface 116, are used to provide each requesting device with a separate instance of the requested streaming service. The rules engine 206 determines that content delivery optimization is not to be performed by failing to identify an entry within the content service provider information for the service provider associated with the received message, by determining that optimization is disabled for the content service provider or by determining that optimization is not designated for the request service.

When the rules engine 206 determines that content delivery optimization is to be performed for a given service based on the content service provider information 210, the rules engines 206 identifies a set of service rules and multicast rules within the rules base 214 that are associated with the requested service. In this embodiment, the rules engine 206 analyzes the content service provider information 500 shown in FIG. 5 and identifies the rules set ID associated with the content service provider or requested service of the provider for the given message. The rules engine 206 uses this ID to obtain the corresponding service rule set and multicast rule set from the rules base 214. In this embodiment, a single service rule and/or multicast rule can be associated with more than one service provided by a content service provider. A similar process is performed to identify rules associated with response messages 400 received from the content server 106.

The service rules interact with the core module 208 to initiate and perform optimization, as well as maintain service state information 212 associated with the services that are being optimized. If the one or more conditions of an associated service rule are not satisfied by a request/response message, ground rules are checked to determine what action to take. In this embodiment, the request/response is passed on to the content server 106 or requestor device without any optimization operations being performed.

Figure 6:
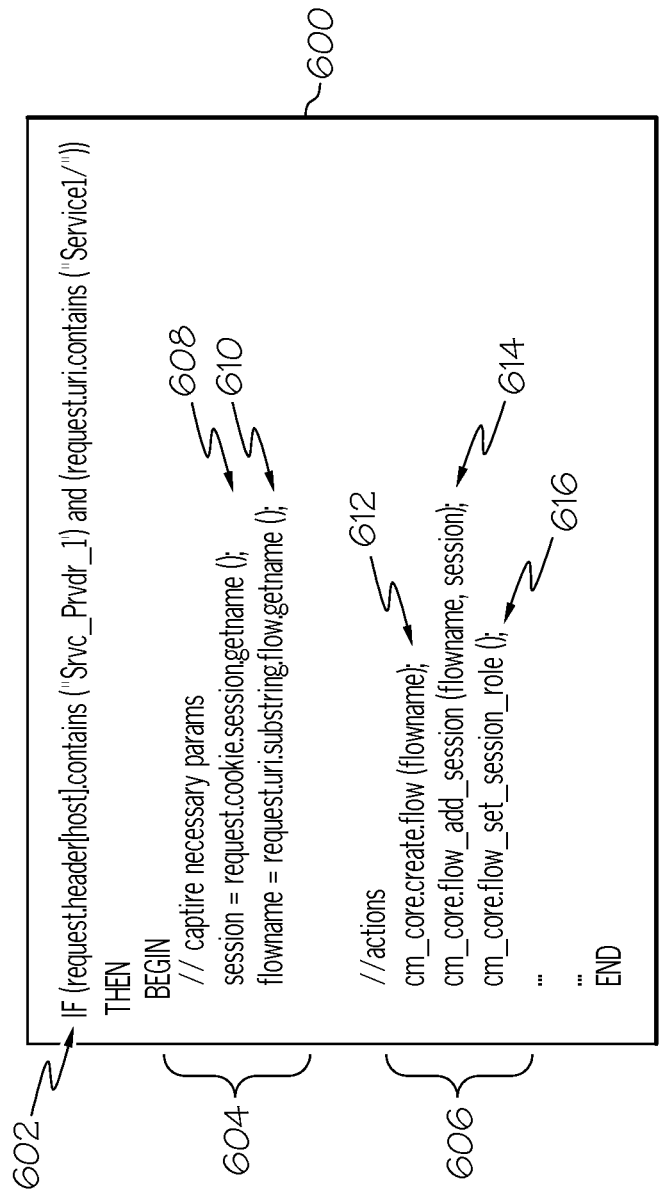
FIG. 6 shows a service rule utilized by the connection manager of FIG. 2 for optimizing delivery of a media streaming service according to one embodiment of the present invention.

FIG. 6 shows an exemplary request message service rule 600 for Service1 provided by content service provider Srvc_Prvdr_1. A similar service rule is included within the service rule set for responses messages. As discussed above, service rules are used by the core module 208 for maintaining service state information 212 for a given service being provided to user devices, and also for optimizing delivery of content streams of that service. The service rule 600 includes one or more conditions 602 that are to be satisfied prior to applying the rule. In an embodiment in which the content service provider information 210 is utilized, any conditions not included within the content service provider information 210 can be included within the service rule 600. Also, information such as the optimization status 518 can be included within the service rule 600 as well.

The service rule 600 also includes a parameter section 604 and an action section 606. The parameter section 604 identifies which parameters the core module 208 is to obtain from the received message 300. In this example of FIG. 6, the service rule 600 indicates that the core module 208 is to obtain a session parameter 606 and a flow name parameter 608 from the request message 300. The service rule 600 also indicates how and where the core module 208 is to obtain these parameters 608 and 610. For example, the service rule 600 indicates that the session parameter 608 is to be obtained from the "Cookie:" field 314 in the header section 304 of the request 300 using the following method: cookie.substring. session.getname() In this example, the core module 208 obtains "SessionID1" from the "Cookie:" field 314 shown in FIG. 3. The service rule 600 also indicates that the flow name parameter 610 is to be obtained from the URI 308 in the request line 302 of the message 300 using the following method: request.uri.substring.flow.getname(). In this example, the core module 208 obtains "Flow1" from the URI 308 shown in FIG. 3. A flow is a unique content stream provided by a service. The parameter section 604 can also identify other parameters to be obtained by the core module 208.

The action section 606 identifies various actions that the core module 208 is to perform with respect to the service state information 212, which is utilized by the core module 208 for optimizing the delivery of content streams of a service to multiple user devices. For example, FIG. 6 shows that the core module 208 is to create a flow object for the state information 212 using the method cm_core.create.flow (flowname) 612, where "flowname" is the flow name parameter 610 obtained by the core module 208 from the message 300. The action section 606 also indicates that the core module 208 is to add a session to the state information 212 using the method cm_core.flow_add_session (flowname, session) 614, where "session" is the session parameter 608 obtained by the core module 208 from the message 300. The action section 606 further indicates that the core module 208 is to assign a role (e.g., primary or secondary) to the requestor device associated with the request using the method cm_core.flow_set_session_role () 616. Other actions can also be included within the service rule 600.

Figure 7:
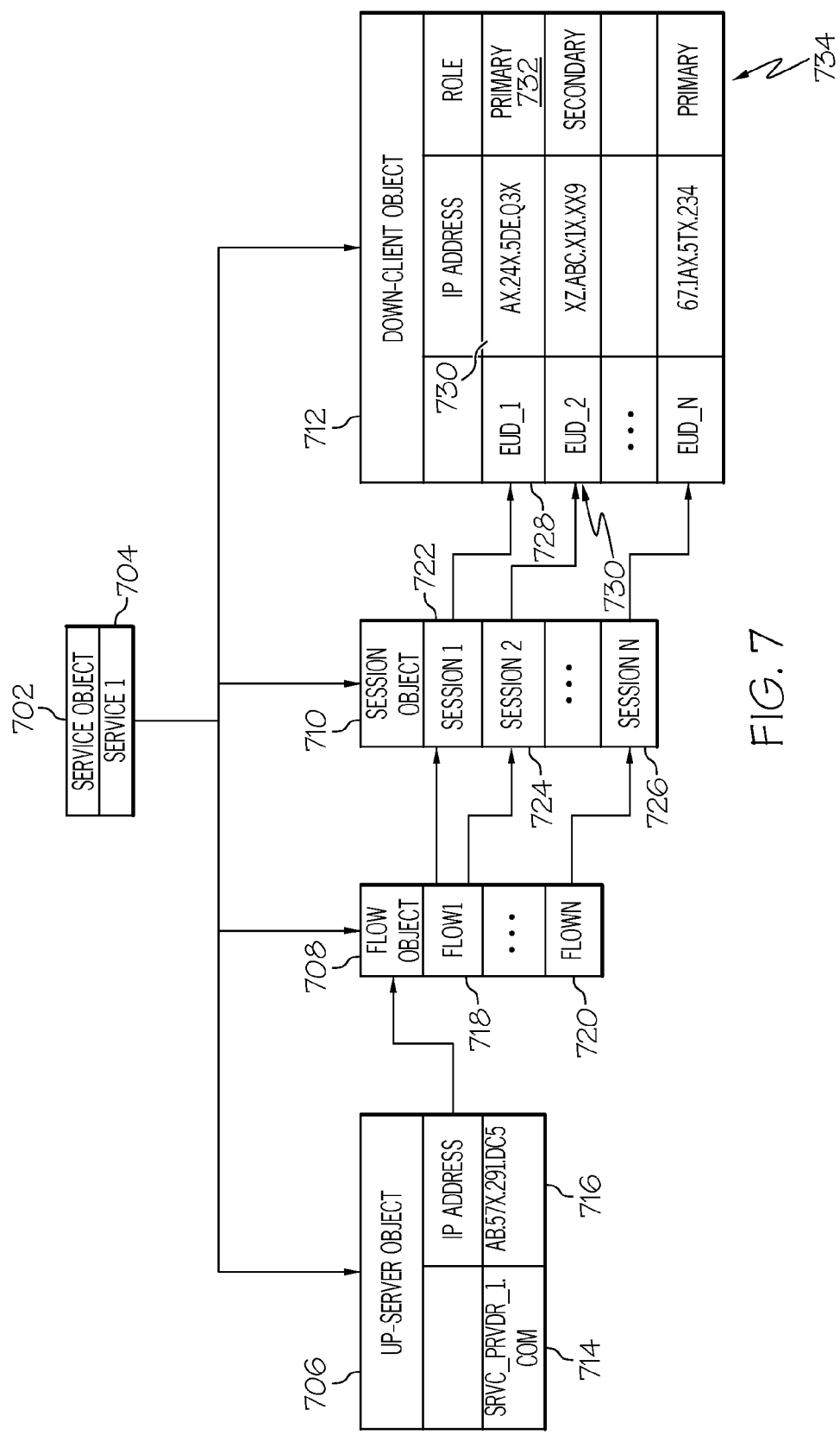
FIG. 7 shows service state information maintained by the connection manager of FIG. 2 according to one embodiment of the present invention.

The core module 208 utilizes the parameters and actions to create, update, and maintain service state information 212 that is utilized by the core module 208 to perform content stream delivery optimization. Service state information 212 includes a plurality of objects or data structures such as queues, tables, lists, and the like, which represent an individual service being optimized based on redundancy. FIG. 7 shows one example of service state information 700 created by the core module 208 based on the service rule 600 of FIG. 6. The service state information 700 includes a service object 702 that is created by the core module 208 when a first request for a service is received and optimization is to be performed for that service. The service object (including any related objects) for the service is then updated as additional requests and responses associated with the service are received.

For example, when the proxy module 202 receives a first request (or request/response pair) from a requestor device for a given service registered by optimization, the core module 208 creates the service object 702, as shown in FIG. 7. In this example, the requested service is "Service1" such as a live-video service, an audio streaming service, or a movie streaming service. The service object 702 represents the individual service (e.g., Service1) being optimized for redundancy. The service object 702 is identified by a unique ID string, such as a unique identifier 704 associated with the service. In the example shown in FIG. 7, this unique identifier is "Service1", which can be obtained from the request 300 or the associated service rule 600.

A service is associated with multiple sessions, one for each requestor device (i.e., down-stream client) receiving/requesting the service. A service is also associated with one or more flows, which are unique content streams provided by the service that are consumable by one or more of the user devices. A service is also associated with a content service provider (i.e., up-stream server) that provides the service in a content stream. Therefore, the connection core module 208 creates an object for each of these entities using the actions identified in the service rule 600. For example, FIG. 7 shows that the service object 702 comprises an up-stream server object 706, a flow object 708, a session object 710, and a down-stream client (requestor) object 712. These objects can be included within the service object itself or can be linked to the service object.

The up-stream server object 706 represents the state of the content service provider (server) that is providing the service represented by the service object 702. The information in the up-stream server object 706 uniquely identifies the content service provider. For example, FIG. 7 shows that the up-stream server object 706 comprises an entry 714 identifying the content service provider Srvc_Prvdr_1.com and another entry 716 comprising the internet protocol (IP) address of Srvc_Prvdr_1.com. The up-stream server object 706 can also include the port number associated with connections to/from the service provider. In this embodiment, the up-stream server object 706 is created by the core module when the proxy module receives a response from the content service provider (or when a request is received from a requestor device).

The flow object 708 represents a unique content stream of the service that is being consumed by one or more clients. The core module 208 creates (or updates) the flow object 708 using a service rule 600 when a session takes an action(s) to avail a content stream. For example, the service rule 600 comprises a method 612 to be performed by the core module for creating a flow object, as discussed above. Based on the request shown in FIG. 3 and the rule 600 shown in FIG. 6, the core module 208 creates a flow object 708 with the flow name "Flow1" obtained from the request 300, which uniquely identifies the flow. A service represented by the service object 702 can provide more than one unique content stream. For example, a live video service can provide multiple channels of live video, where each channel is a unique content stream. The user device can specify a given flow of a service in the request message (e.g., "//srvc_prvdr_1.com/Service1/Flow1" or "//srvc_prvdr_1.com/Service1/FlowN"). Therefore, a separate entry (or flow object) is created for each unique content stream of the service being consumed/received by requestor devices. A single flow object 708 for each flow can be created, or a global flow object can be created that comprises an entry (or object) for each flow.

The session object 710 represents an information interchange during which a requestor device receives a content stream provided by the requested service. The core module 208 creates (or updates) a session object 710 using a service rule 600 when a requestor device requests a service, for which a session specific to that service is opened. For example, the service rule 600 comprises a method 614 to be performed by the core module 208 for adding a session object for a given flow, as discussed above. Based on the request 300 shown in FIG. 3, the core module 208 creates an entry 722 (or separate session object) with the session ID name "SessionID1" obtained from the request 300 within the flow object 708. The session ID name uniquely identifies the session associated with the requestor device requesting the service. Because this session is associated with the flow "Flow1", the core module links (as indicted by the arrow) this session object entry 722 to the flow object entry 718 for Flow1. Any linking mechanism such as a pointer can be used to link these two object entries together. Multiple requestor devices can request the same service, and the core module 208 creates a separate session object entry for each requestor device requesting the service. For example, FIG. 7 shows that additional entries 724 and 726 have been added to the session object 710. A single session object 710 for each session can be created, or a global session object 710 can be created that comprises an entry (or object) for each session.

The down-stream client object 712 represents the state of each requestor being managed by the connection manager 130 for the service represented by the service object 702. For example, FIG. 7 shows that the down-stream client object 712 comprises an entry 728 identifying END_USER_DEVICE1 (EUD1) and another entry 730 comprising the internet protocol (IP) address of EUD1. The down-stream client object 712 can also include the port number associated with connections to/from the requestor device. The information in the down-stream client object 712 uniquely identifies the requestor. The down-stream client object 712 also comprises a role entry 732 which indicates the role of the requestor with respect to the given content stream (flow).

In this embodiment, the first requestor device to request a given service is referred to as the primary client. Each subsequent requestor device requesting the same service is referred to as a secondary client. A single down-stream client object 712 for each requestor device can be created, or a global down-stream client object 712 can be created that comprises an entry (or object) for each requestor device. As the delivery of the content streams progresses, arbitrary events may occur (e.g., the primary client or a secondary client may drop out). Also, either type of requestor may request change to another content stream, or may request an entirely new service. Any and all of these events are managed via the service rule in an automatic and transparent manner.

At any given instance, multiple service objects can be active, multiple client objects can be active, and multiple down-stream client objects and up-stream server objects can be active all of which participate and cooperate in the optimization of delivery of content streams. The simultaneous, concurrent operation of multiple service objects is referred to as multi-tenancy. This enables the use of common connection manager elements for optimization of disparate services for content delivery.

Figure 8:
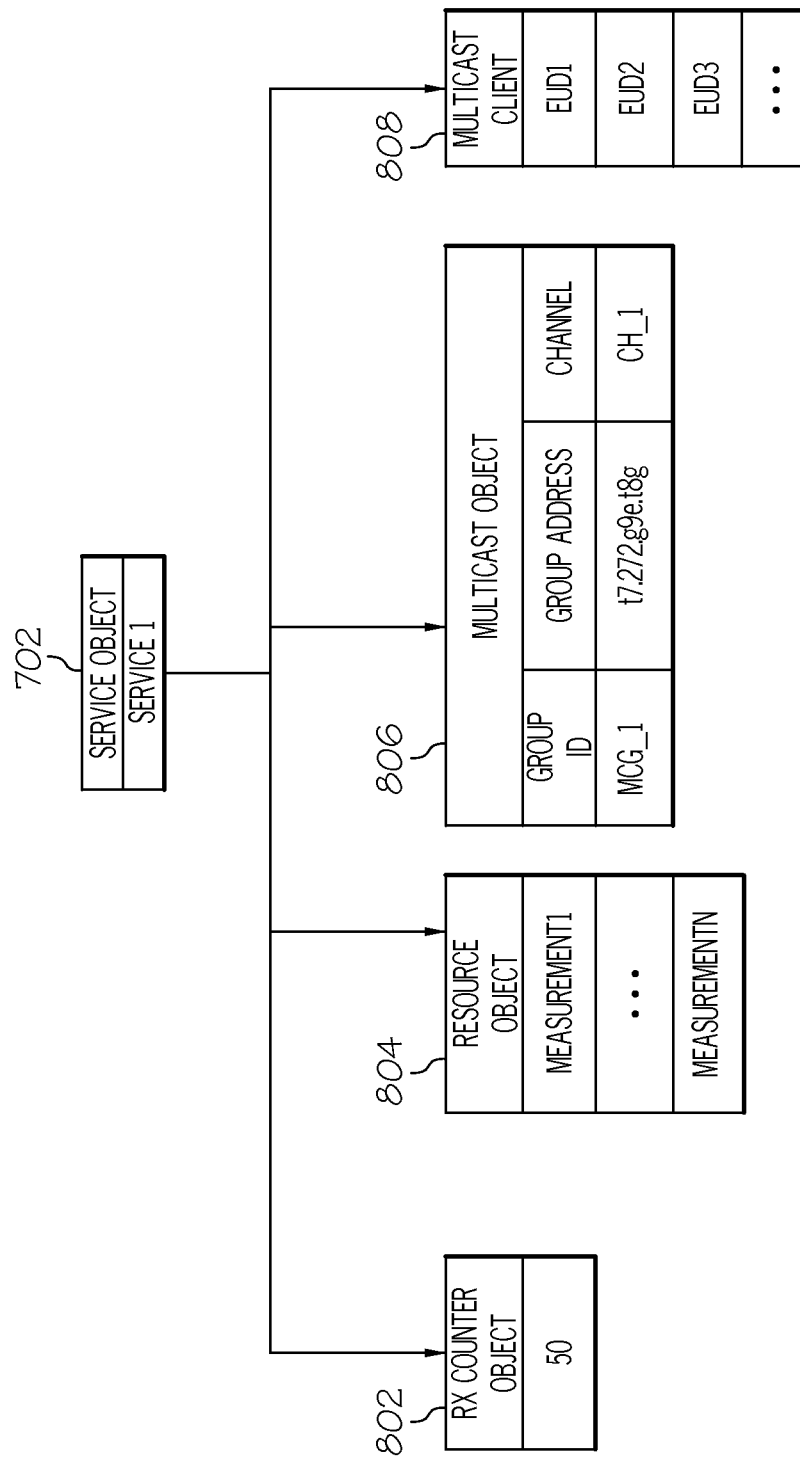
FIG. 8 shows multicast state information maintained by the connection manager of FIG. 2 according to one embodiment of the present invention.

In addition to the service state information 212, the core module 208 also maintains information associated with the conditions/thresholds of a multicast rule set, as shown in FIG. 8. This information can be maintained as objects within the service state information 212 or can be stored separately from the service state information 212. In one embodiment, the core module 208 maintains a reception/request object (Rx object) 802 that includes the count of each requestor device currently receiving or requesting a service associated with a service object 702. Other service metrics such as radio channels in use for the given service can also be captured.

The core module 208 also maintains spectrum channel resource information as a resource object 804 that comprises entries associated with various measurements indicating a current state of spectrum channel resources. Some examples of the resource information and/or measurements maintained in the resource object 804 include (but are not limited to): (1) number of channels being concurrently utilized to deliver the service, (2) number of unicast connections serving the requestor devices across the geographical area supported by the air interface, (3) delivered data rates to the requestor devices of the service, and (4) share of the spectrum resource that is consumed in the delivery of the service as a function of time. The rules engine 206 utilizes this information to determine when a multicast optimization condition/threshold indicated within a given multicast rule set has been satisfied. As explained above, the conditions/thresholds trigger the core module 208 to perform one or more actions for providing content service streams over the air interface 116 utilizing one or more multicast links.

In one exemplary embodiment, a multicast rule set indicates that when a given number of requestor devices receive and/or request a given media streaming service, or when spectrum channel resource availability is below a given amount, the core module 208 is to transmit the service using a multicast link. However, it should be noted that in another embodiment the service rules can indicate that a given service is to be automatically delivered to requestor devices using multicast links irrespective of conditions and/or thresholds. The rules manager 206 analyzes the information shown in FIG. 8 to determine if any of these multicast conditions has occurred. If a multicast condition has occurred or a multicast threshold has been reached or exceeded, the core module 208 performs one or more actions as indicated by the multicast rule set. In this embodiment, the core module 208 sends one or more instructions/commands to the MCE 122 to set up and allocate one or more radio channels for multicasting the given service to the requestor devices.

Once allocated, the MCE 122 sends information associated with the channel(s), such as the channel ID, to the connection manager 130. The core module 208 then assigns this channel to a multicast group for the given service. In this embodiment, the core module 208 instructs the eNode B 114 to create a new multicast group for the given service. A multicast group is established for a given service utilizing a protocol such as the Internet Group Message Protocol (IGMP). The core module 208 stores the channel information and multicast group information as a multicast object associated with the service, as shown in FIG. 8. More specifically, the core module 208 creates a multicast object 806 that is linked to the service object 702 of the given service. This object 806 can be part of or separate from the service state information 212. In FIG. 8, a multicast object for Service1 identifies the multicast group MCG__1 assigned to Service1 and the channel CH__1 set up for MCG__1.

The core module 208 analyzes the service state information 212 to identify each of the requestor devices receiving (or requesting) the given service (or particular flow stream of the service), and instructs each of these requestor devices to join the multicast group associated with the service. This message includes the channel ID and the multicast group ID (e.g., multicast group address) associated with the streaming service. In this embodiment, the core module 208 transmits a subscription announcement over the air interface 116 to each of the requestor devices currently receiving or requesting the streaming service over a unicast connection. This announcement notifies each of these requestor devices of the upcoming multicast service for the streaming service. This message includes the channel, IP multicast address, session attributes, and so on that is associated with the multicast group. The requestor devices send, via the air interface 116, a join message to the connection manager 130 indicating their willingness to join the multicast group. The core module 208 adds or updates a multicast client object 808 that identifies each requestor participating in the multicast group, as shown in FIG. 8.

The core module 208 converts the requestor devices within the multicast group from unicast links to a single multicast link over the air interface 116 utilizing the allocated channel. The connection manager 130 also tears down all of the prior unicast links with the requestor devices. If a new request is received for the service, the core module 208 adds the new requestor to the multicast group. The core module 208 updates the service state information 212 (such as the down-client object, Rx object, Resource object, and so on) and the multicast information 806 and 808 as new requestor devices are added to the multicast group and as current requestor devices leave the group. In one embodiment, if the conditions and/or thresholds of the multicast rules are no longer satisfied in response to requestor devices no longer receiving the content stream, the core module 208 re-establishes unicast links (i.e., separate channels) with each remaining requestor over the air interface 116, as well as a single (or multiple) as unicast link(s) with the content server 106 for each requestor. The core module 208 updates the service state information 212 and multicast information 806 and 808 accordingly.

Figure 9:
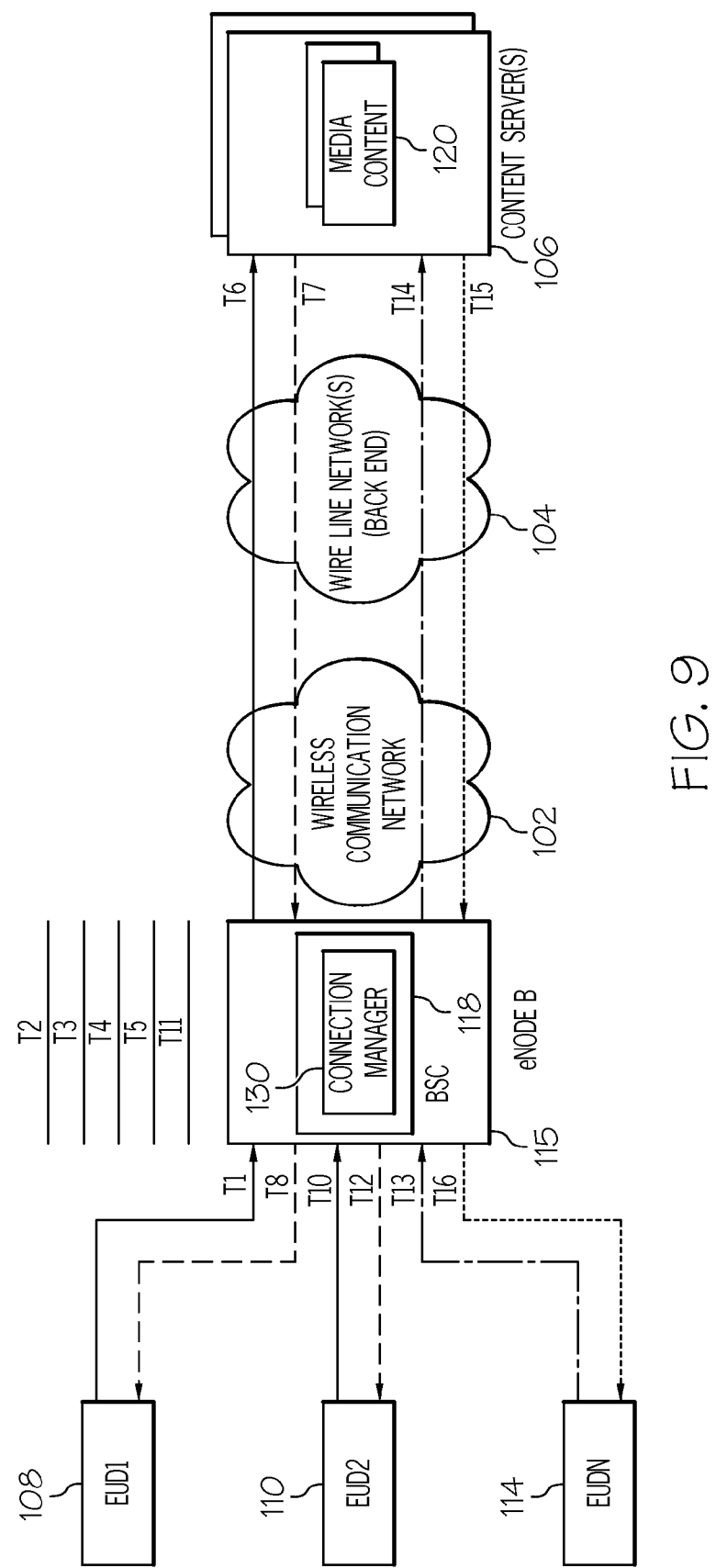
FIGS. 9 and 10 illustrate a process for optimizing delivery of a media streaming service within a wireless communications network according to one embodiment of the present invention.

FIG. 9 is a transaction diagram showing a first optimization of content streams of a requested service by the connection manager 130 in accordance with one embodiment of the present invention. The connection manager 130 receives a first request for a service, Service1, from a first requestor device 108 (EUD1) over the air interface 116, at T1. An example of this request is shown in FIG. 3. The connection manager 130 identifies the communication protocol associated with the request, at T2. In this example, the connection manager 130 determines that the request message is an HTTP request message. The connection manager 130 parses the request message based on one or more ground rules, at T3, to determine if delivery of the requested content is to be optimized. For example, the connection manager 130 parses the request message to identify the requested streaming service and/or content service provider associated therewith. The connection manager 130 then determines if the media streaming service and/or content service provider is registered for optimization.

In this example, the connection manager 130 determines that optimization is to be performed for delivery of the content stream(s) provided by the requested service. The connection manager 130, at T4, analyzes the service state information 700 of FIG. 7 to determine if a service object already exists for the requested service, Service1. The connection manager 130 determines that a service object does not exist for Service1 and proceeds to create a new service object 702, at T5. Because a service object did not previously exist for Service1, the connection manager 130 determines that this is the first request for Service1.

The connection manager 130 also creates the flow object 708, the session object 710, the down-stream client object 712, and optionally the up-stream server object 706 with their corresponding information, as explained above. For example, FIG. 7 shows that EUD1 is the primary client since it is the first device to request Service1. FIG. 7 also shows that EUD1 is associated with a session, Session1, which has been established to receive Flow1 of Service1. The connection manager 130 passes the request message to the content server 106, at T6. The content server 106 processes the request and sends a response back to the EUD1 over a unicast link, which is intercepted by the connection manager 130, at T7.

The connection manager 130 performs similar operations on the response message at times T2, T3, T4, and T5. For example, the connection manager 130 analyzes the response message to identify its protocol. Then, based on the identified protocol, the connection manager 130 performs specific parsing operations for that protocol to identify information within the response message required by one or more ground rules and/or service rules. In one embodiment, the connection manager 130 utilizes the information obtained from the response message and the rules to identify the associated service object 702 within the service state information 700 and to create an up-stream server object 706 for the content service provider (if not already created). FIG. 7 shows that an up-stream server object 706 has been created for service provider Srvc_Prvdr_ 1.com, which identifies the service provider associated with the service being delivered by the content server 106 and also the IP address of the service provider. The up-stream server object 706 (or part of the up-server object) can also be created when a request message is received from the requestor device EUD1.

Based on the information obtained from the response message and the associated rules, the connection manager 130 determines that the response is associated with Flow1 of Service1 and analyzes the service state information 700. The connection manager 130 determines, based on the state information 700, that EUD1 is currently the only client that has requested Flow1 of Service1. The connection manager 130 sends content stream Flow1 from Service1 to EUD1 utilizing a unicast link over the air interface 116, at T8. The connection manager 130 also captures Flow1 in a content flow queue. The connection manager 130 receives a second request for Service1 from a second user device 110 (EUD2) over the air interface 116, at T10. The connection manager 130 performs similar operations for this request. In particular, the connection manager 130 determines that EUD2 is requesting to receive Flow1 of Service1. The connection manager 130 also determines that a service object already exists for Service1. Therefore, the connection manager 130 creates/adds a down-stream client object entry 730 and a session object entry 724 for EUD2. Because flow object entry 718 already exists for Flow1, the connection manager 130 links the Flow1 object entry 718 to the session object entry 724 associated with EUD2, as shown by the arrow in FIG. 7.

The connection manager 130 further determines that the request received from EUD2 is a redundant request based on the information parsed from the request received from EUD2, the ground rules, the service rules, and the state information 700. Stated differently, the connection manager 130 determines that at least one other requestor device, EUD1, is currently receiving the content stream Flow1 of Service1 that was requested by EUD2. The connection manager 130 assigns a secondary role to EUD2 in the down-stream client object entry 730 associated with EUD2 and optimizes the delivery of Flow1 to EUD2. In this example, the connection manager 130 replicates the content stream Flow1 of Service1 being received from the content server 106 for EUD1, at T11. If Flow1 is being maintained in a content flow queue, the connection manager 130 can locally replicate Flow1 from the content queue. The connection manager 130 then sends this replicated content stream to EUD2 utilizing another unicast link over the air interface 116, at T12. This optimization prevents the request from EUD2 from passing to the content server 106, which would generate a separate link with EUD2. Therefore, only a single link/connection is required to be established by the content server 106 for delivering Flow1 to multiple users. This saves computing and bandwidth resources between the content server 106 and the air interface 116, while still providing a satisfactory user experience at the requestor devices.

FIG. 9 also shows that a third request is received by the connection manager 130 from a third requestor device 112 (EUD3) over the air interface 116, at T13. In this example, EUD3 is requesting FlowN from Service1. The connection manager 130 performs operations similar for this request. In particular, the connection manager 130 determines that EUD3 is requesting the same service as EUD1 and EUD2, but is also requesting a different content stream, FlowN, from Service1. Therefore, because a service object 702 already exists for Service1, the connection manager adds the appropriate object entries within the state information 700 for EUD3. The connection manager 130 assigns a primary role to EUD3 since it is the first client to request FlowN of Service1, as shown in the down-stream client object entry 734 of EUD3 in FIG. 7. Because the connection manager 130 determines that this is not a redundant request, the connection manager passes the request to the content server 106, at T14. The content server 106 processes the request and sends a response to EUD3 utilizing a unicast link, which is intercepted by the connection manager 130, at T15. The connection manager 130 determines, based on the state information 700, that EUD3 is currently the only client that has requested FlowN of Service1. The connection manager 130 sends content stream FlowN from Service1 to EUD3 utilizing a unicast link over the air interface 116, at T16.

Figure 10:
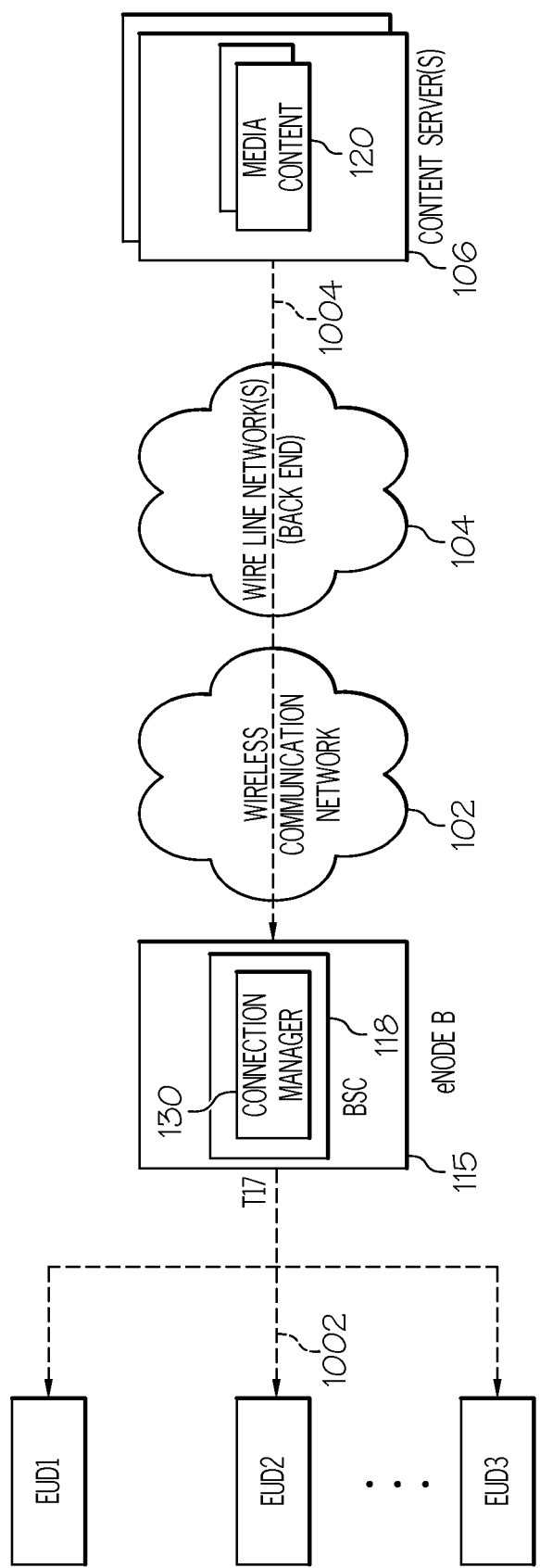

FIG. 10 is transactional diagram showing a second optimization of the delivery of a media streaming service by the connection manager 130 in accordance with one embodiment of the present invention. FIG. 10 shows a point in time after the transactions in FIG. 9 have occurred and a third request for Service1 from a fourth requestor (EUD3) over the air interface 116 has been intercepted by the connection manager 130. While the combination is shown for purposes of illustration, the optimization process shown in FIG. 9 is not required to be performed before the optimization process of FIG. 10. If the optimization process of FIG. 9 is not performed, the optimization of FIG. 10 is performed when separate unicast links exist between the requestor devices and the connection manager In the exemplary embodiment, the optimization of FIG. 10 is performed when separate unicast links exist between the requestor devices and the connection manager 130. In this process, the connection manager 130 performs operations for the third request received from EUD3 that are similar to those performed at times T2, T3, T4, and T5 of FIG. 9. The connection manager 130 further analyzes one or more multicast rule sets associated with Service1 and determines that a multicast threshold has been reached (or exceeded). In this example, the connection manager 130 determines that the number of devices receiving/requesting Flow1 of Service1 has exceeded a given threshold. The connection manager 130, at T17, then transmits Flow1 using a single multicast channel 1002 to each of the requestors EU1, EUD2, and EUD3, as show in FIG. 10. The connection manager 130 tears down (i.e., disconnects) all the unicast links between the requestor devices EUD1, EUD2, and EUD3. In this embodiment a single unicast link 1004 already exists between the connection manager 130 and the content server 106 for Service1 as a result of the optimization process of FIG. 9. Therefore, in FIG. 10, the media streaming service is transmitted from the content server 106 to multiple requestor devices using a single unicast link 1004 between the content service 106 and connection manager 130, and a single multicast link 1002 over an air interface 116 between the requestor devices and the connection manager 130.

It should be noted that in addition to a wireless communications network, embodiments of the present invention are also applicable to an all wired (or at least non-cellular) network. For example, the optimization process discussed above with respect to FIG. 9 allows for multicast operations to be performed within (but not limited to) wired local area networks (LANs). In this example, multiple hosts are connected to the same LAN, which is enabled for IP multicast. The connection manager 130 is situated within another node of the network and is communicatively coupled to the LAN. The optimization process of FIG. 9 is used by the connection manager 130 to provide requested services to the hosts of the LAN using IP multicast links.

Figure 11:
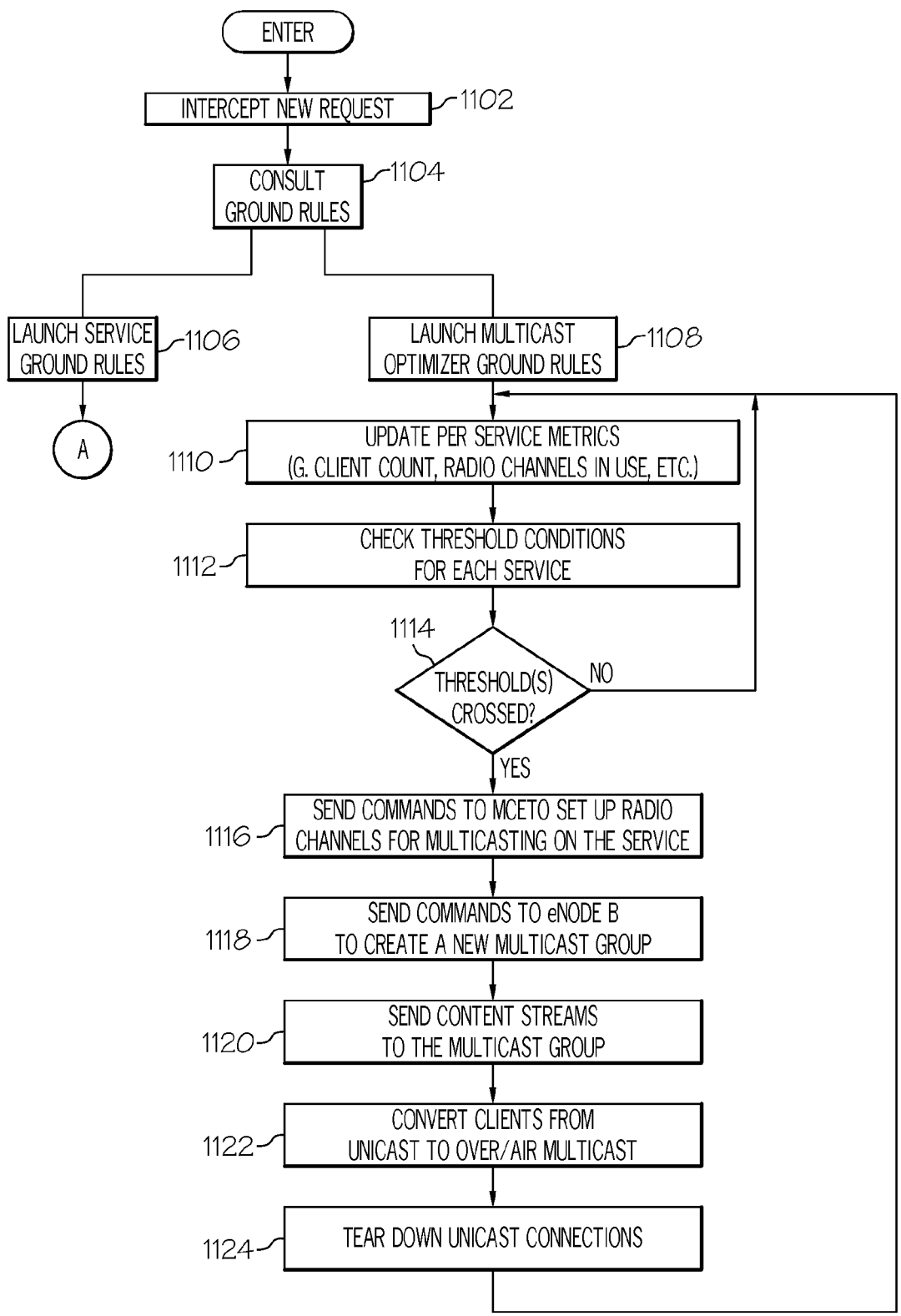
FIG. 11 is an operational flow diagram illustrating optimized delivery of a media streaming service in a wireless communications network according to one embodiment of the present invention.

FIG. 11 is an operational flow diagram illustrating optimization of the delivery of media streaming services in a wireless communications network utilizing multicast over the air interface and unicast with the content server according to one embodiment of the present invention. The connection manager 130 receives/intercepts a request for a given service over the air interface 116, at step 1102. The connection manager 130 analyzes ground rules, at step 1104. The connection manager 130 launches/executes service ground rules and multicast optimization ground rules, at steps 1106 and 1108, respectively.

Figure 13:
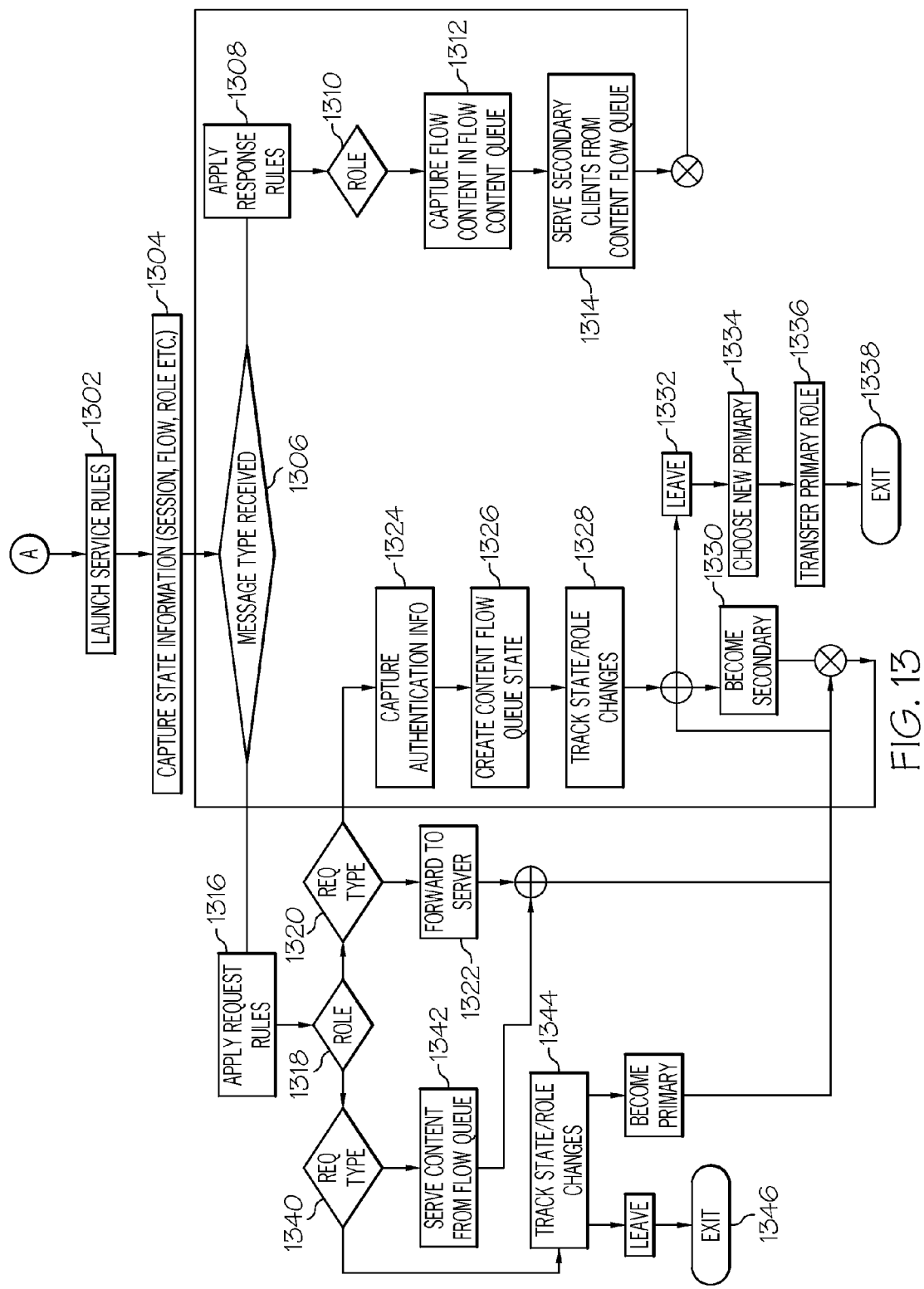

The connection manager 1106 applies ground rules and service rule sets to each service being requested by requestor devices and the control flows to entry point A of FIG. 13. Based on ground rules for multicast optimization, the connection manager 130 updates service metrics associated with the requested service such as requestor count, radio channels in use for the service, and so on, at step 1110. The connection manager 130 compares the service metric information against one or more conditions/thresholds within multicast optimization rules, at step 1112.

The connection manager 130 determines if the conditions/thresholds have been crossed, at step 1114. If the conditions/thresholds have not been crossed, the control flow returns to step 1110. If the conditions/thresholds have been crossed, the connection manager 130 instructs the MCE 122 to set up and allocate one or more radio channels for multicasting the service, at step 1116. The connection manager 130 instructs the eNode B 115 to create a new multicast group for the service (e.g., by notifying the requestor devices to join the group and informing them of the multicast group address and channel), at step 1118. The connection manager 130 transmits the service to the requestor devices in the multicast group using a single multicast channel over the air interface 116, at step 1120. The connection manager 130 converts the requestor devices in the multicast group from unicast links to a multicast link, at step 1122. The connection manager 130 tears down (i.e., disconnects) the unicast links between the requestor devices and the connection manager 130, at step 1124. The control flow then returns to step 1110.

Figure 12:
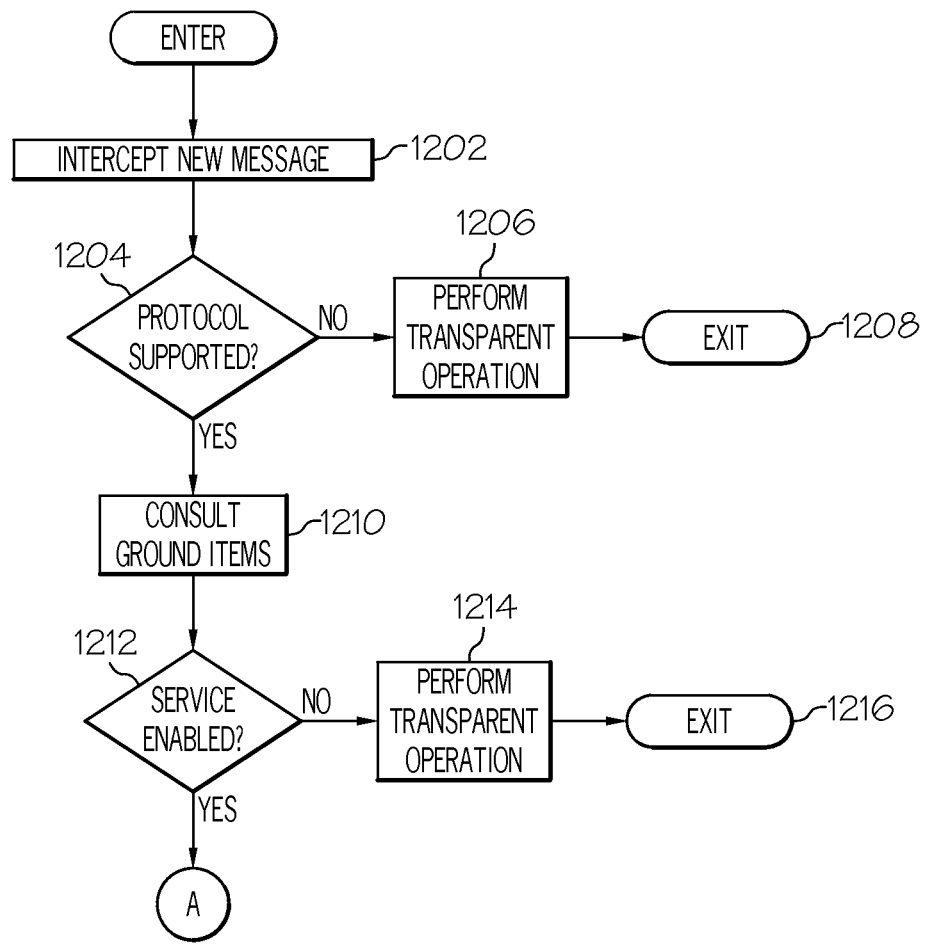
FIGS. 12 and 13 are operational flow diagrams illustrating optimized delivery of a media streaming service according to another embodiment of the present invention.

FIGS. 12 and 13 are operational flow diagrams illustrating optimization of the delivery of media streaming services according to one embodiment of the present invention. The connection manager 130 intercepts/receives a new message, at step 1202. The connection manager 130 determines if the communication protocol of the request is supported, at step 1204. If the communication protocol is not supported, the connection manager 130 performs one or more transparent operations such as passing the message on to the content server 106 (or the requestor device 108), at step 1206. The control flow then exits at step 1208. If the communication protocol is supported, the connection manager 130 applies one or more ground rules to the message, at step 1210.

The connection manager 130 then determines if delivery optimization is enabled for the media streaming service associated with the message, at step 1212. If delivery optimization is not enabled, the connection manager 130 performs one or more transparent operations such as passing the message onto the content server 106 (or the requestor device 108), at step 1214. The control flow then exits at step 1216. If delivery optimization is enabled, the connection the control flows to entry point A of FIG. 13. The steps shown in FIG. 13 are performed for each service that is registered for delivery optimization (multi-tenancy).

The connection manager 130 applies/executes one or more service rules associated with the specific media streaming service associated with the message, at step 1302. The connection manager 130 captures information to create service state information 212 such as session, flow, and role information, at step 1304. The connection manager 130 determines whether the received message is a response or a request message, at step 1306. If the received message is a response message, the connection manager 130 applies the appropriate response service rules for the media streaming service associated with the message, at step 1308. Because optimization is enabled, the connection manager 130 only receives a response from the content server 106 for a first requestor of the media streaming service since the connection manager 130 does not pass redundant requests for the media streaming service to the content server 106. Therefore, the connection manager 130 determines that the requestor device 108 requesting the media streaming service is a primary client, at step 1310. The connection manager 130 captures the content flow/stream from the content server 106 to the primary requestor device 108 and stores this flow within a content flow queue, at step 1312. The connection manager 130 then serves any subsequent requestor devices (secondary clients) of the media streaming service from this content flow queue, at step 1314. The flow then returns to step 1306.

If the message received is a request from a requestor device 108, the connection manager 130 applies the appropriate request service rules for the media streaming service associated with the message, at step 1316. The connection manager 130 then determines the role of the requestor device 108, at step 1318. If the requestor device 108 is a primary client, the connection manager 130 determines the request type, at step 1320. As discussed above, the request can be for a "push" media streaming service where the requestor device is not required to request content since the content is pushed out to the device, or a "pull" media streaming service where requestor devices are required to send explicit requests for content to the service. The type of service being requested in FIG. 13 is a "pull" media streaming service for purposes of illustration. Therefore, the connection manager 130 determines if the request is request for content or a non-content request, which identifies the requested service, the requested content flow/stream, etc.

If the connection manager 130 determines that a primary client has sent a content request, the connection manager 130 forwards the request to the content server 106, at step 1322. The control flow then returns to step 1306. If the connection manager 130 determines that a primary client has sent a non-content request, the connection manager 130 captures authentication information from the request, at step 1324. The connection manager 130 creates a content flow queue state (e.g., a flow object), at step 1326. The connection manager 130 also tracks state/role changes, at step 1328. For example, a primary client can become a secondary client, at step 1330. A primary client can also leave or disconnect from the service or content flow/stream, at step 1332. If this occurs, the connection manager 130 selects a new primary client and transfers the primary role to the selected client, at steps 1334 and 1336, respectively. This tracking information is maintained within the service state information 212. The control flow then exits at step 1338.

Returning to step 1318, if the connection manager 130 determines that the requestor device is a secondary client, the connection manager 130 also determines the request type, at step 1340. If the request type is a content request, the connection manager 130 serves the content flow that has been captured in the flow/stream queue, at step 1342. Stated differently, the connection manager 130 replicates the content flow/stream being received by the primary client and sends this replicated content flow to the secondary client. The control flow then returns to step 1306. If the request is a non-content request, the connection manager 130 tracks the state/role changes associated with this secondary client, at step 1344. If the secondary client leaves/disconnects from the service or content flow/stream the control flow exits, at step 1346. If the secondary client becomes a primary client then the control flow returns to step 1306.

Figure 14:
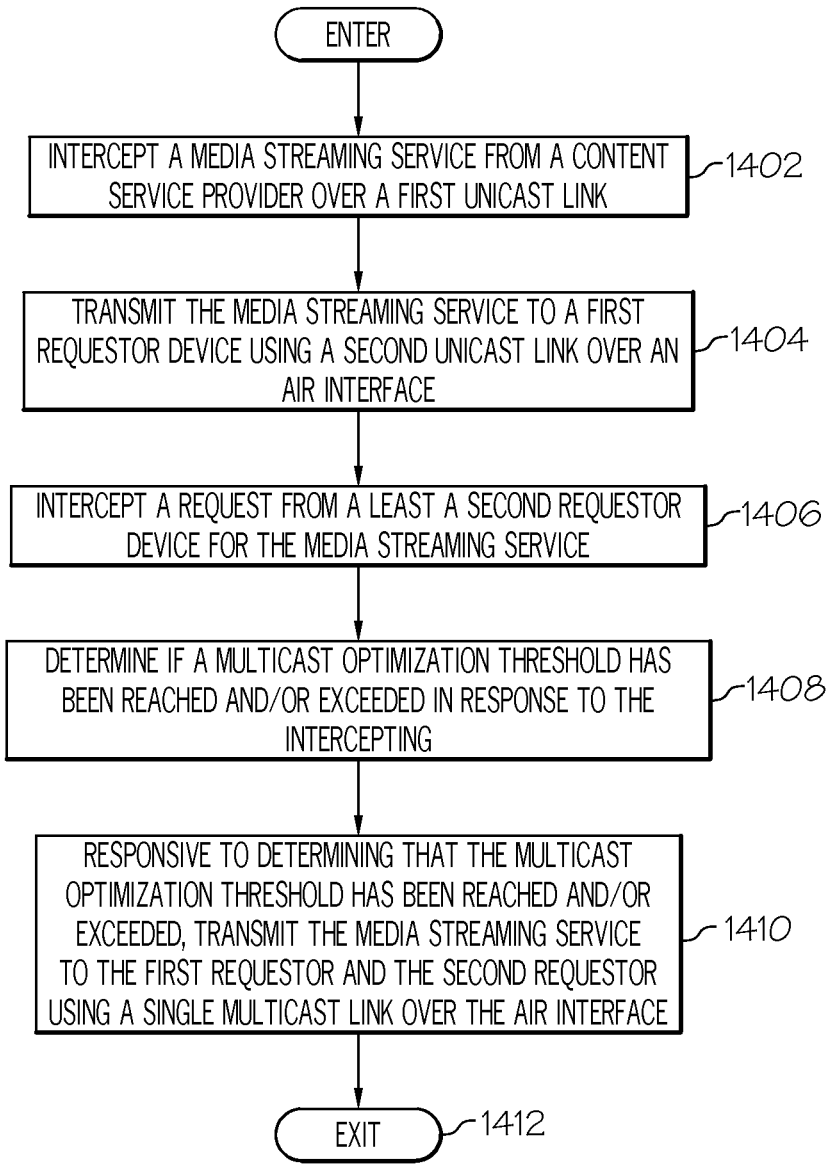
FIG. 14 is an operational flow diagram illustrating optimized delivery of a media streaming service according to yet another embodiment of the present invention.

FIG. 14 is an operational flow diagram illustrating optimization of the delivery of media streaming services according to another embodiment of the present invention. The connection manager 130 intercepts a media streaming service from a content service provider over a first unicast link, at step 1402. The connection manager 130 transmits the media streaming service to a first requestor device using a second unicast link over an air interface, at step 1404. The connection manager 130 intercepts a request from a least a second requestor device for the media streaming service, at step 1406. The connection manager 130 determines if a multicast optimization threshold has been reached or exceeded in response to the intercepting, at step 1408. The connection manager 130, responsive to determining that the multicast optimization threshold has been reached or exceeded, transmits the media streaming service to the first requestor and the second requestor, at step 1410. The media streaming service is transmitted using a single multicast link over the air interface while the media streaming service is being received from the content service provider over the first unicast link. The control flow exits at step 1412.

Figure 15:
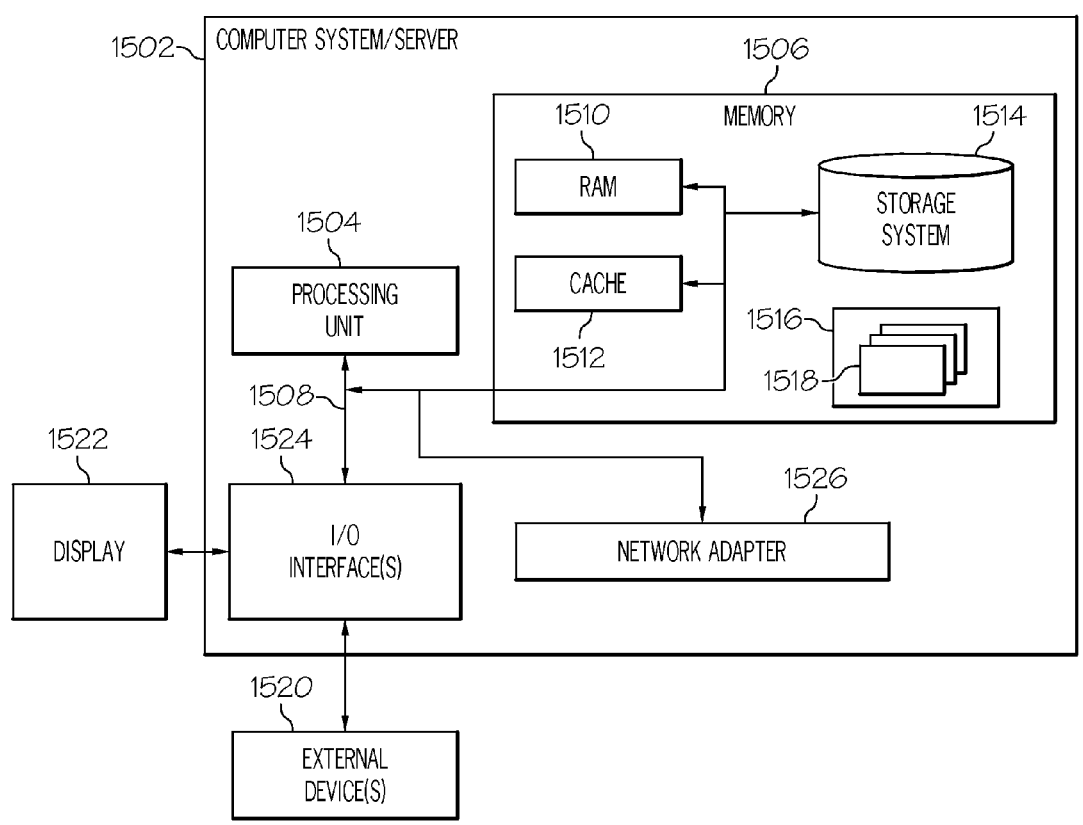
FIG. 15 illustrates an information processing system for use in embodiments of the present invention.

FIG. 15 shows a schematic of an exemplary information processing system 1502 for use in embodiments of the present invention. Information processing system 1502 is only one example of a suitable system and is not intended to limit the scope of use or functionality of embodiments of the present invention described above. The exemplary information processing system 1502 is capable of implementing and/or performing any of the functionality set forth above.

The information processing system 1502 can be a base station controller, an information system communicatively coupled to a wireless communications network, a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 15, the information processing system 1502 is in the form of a general-purpose computing device. The components of the information processing system 1502 can include, but are not limited to, one or more processors or processing units 1504, a system memory 1506, and a bus 1508 that couples various system components including the system memory 1506 to the processor 1504.

The bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1502 typically includes a variety of computer system readable media. Such media may be any available media that is accessible by the information processing system 1502, and it includes both volatile and non-volatile media, removable and non-removable media.

The system memory 1506, in one embodiment, comprises the connection manager 130 and its components, the content service provider information 210, the service state information 212, and the rules base 214 and rules 216. These one or more components can also be implemented in hardware. The system memory 1506 can include computer system readable media in the form of volatile memory, such as random access memory (RAM) 1510 and/or cache memory 1512. The information processing system 1502 can further include other removable/non-removable, volatile/non-volatile computer system storage media. By way of example only, a storage system 1514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1508 by one or more data media interfaces. The memory 1506 can include at least one program product having a set of program modules that are configured to carry out the functions of an embodiment of the present invention.

Program/utility 1516, having a set of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of embodiments of the present invention.

The information processing system 1502 can also communicate with one or more external devices 1520 such as a keyboard, a pointing device, a display 1522, etc.; one or more devices that enable a user to interact with the information processing system 1502; and/or any devices (e.g., network card, modem, etc.) that enable computer system/server 1502 to communicate with one or more other computing devices. Such communication can occur via I/O interfaces 1524. Still yet, the information processing system 1502 can communicate with one or more networks such as a local area network (LAN), a general wide area network (WAN), and/or a public network (e.g., the Internet) via network adapter 1526. As depicted, the network adapter 1526 communicates with the other components of information processing system 1502 via the bus 1508. Other hardware and/or software components can also be used in conjunction with the information processing system 1502. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with a network node, for optimizing content delivery in a network, the network comprising the network node communicatively coupled between a plurality of client devices and at least one content service provider, the method comprising:
   receiving a media streaming service from the content service provider over a first unicast link;
   transmitting the media streaming service to a first requesting client device in the plurality of client devices via a second unicast link;
   intercepting a request from a second requesting client device in the plurality of client devices for the media streaming service;
   determining if a multicast optimization threshold has been at least one of reached and exceeded based on the request from the second requesting device; and
   based on determining that the multicast optimization threshold has been at least one of reached and exceeded:
      transmitting the media streaming service to the first requesting client device and the second requesting client device via a single multicast link as the media streaming service is being received from the content service provider over the first unicast link;
      after transmitting the media streaming service to the first requesting client device and the second requesting client device, determining, if the multicast optimization threshold is no longer at least one of reached and exceeded; and
   based on determining that the multicast optimization threshold is no longer at least one of reached and exceeded:
      re-establishing the second unicast link with the first requesting client device;
      establishing a third unicast link with the second requestor device; and
      transmitting the media streaming service to the first requesting client device over the second unicast link and transmitting the media streaming service to the second requesting client device over the third unicast link.

2. The method of claim 1, wherein the media streaming service is transmitted to the first requesting client device and the requesting client requestor device via the single multicast link over an air interface.

3. The method of claim 1, wherein transmitting the media streaming service to the first requesting client device and the second requesting client device comprises notifying the first requesting client device and the second requesting client device to join a multicast group associated with the media streaming service.

4. The method of claim 3, wherein transmitting the media streaming service to the first requesting client device and the second requesting client device further comprises disconnecting the second unicast with the first requesting client device.

5. The method of claim 1, wherein the network node is communicatively coupled to at least one base station.

6. The method of claim 1, wherein the multicast optimization threshold is a defined number of requesting client devices at least one of receiving and requesting the media streaming service.

7. The method of claim 1, wherein the multicast optimization threshold is based on an availability of spectrum channel resources.

8. The method of claim 1, further comprising:
   based on determining that the multicast optimization threshold has not been at least one of reached and exceeded:
      replicating the media streaming service being received from the content service provider over the first unicast link; and
      transmitting the media streaming service to the second requesting client device using a third unicast link, only the first unicast link for the media streaming service being established between the content service provider and the network node.

9. An information processing system for optimizing content delivery in a network, the network comprising the information processing system communicatively coupled between a plurality of client devices and at least one content service provider, the information processing system comprising:
- a memory;
- a processor communicatively coupled to the memory; and
- a connection manager communicatively coupled to the processor and the memory, wherein the connection manager is configured to perform a method comprising:
  - receiving a media streaming service from the content service provider over a first unicast link;
  - transmitting the media streaming service from to a first requesting client device in the plurality of client devices via a second unicast link;
  - intercepting a request from a second requesting client device in the plurality of client devices for the media streaming service;
  - determining if a multicast optimization threshold has been at least one of reached and exceeded based on the request from the second requesting device; and
  - based on determining that the multicast optimization threshold has been at least one of reached and exceeded:
    - transmitting the media streaming service to the first requesting client device and the second requesting client device via a single multicast link as the media streaming service being received from the content service provider over the first unicast link;
    - after transmitting the media streaming service to the first requesting client device and the second requesting client device, determining, if the multicast optimization threshold is no longer at least one of reached and exceeded; and
    - based on determining that the multicast optimization threshold is no longer at least one of reached and exceeded:
      - re-establishing the second unicast link with the first requesting client device;
      - establishing a third unicast link with the second requestor device; and
      - transmitting the media streaming service to the first requesting client device over the second unicast link and transmitting the media streaming service to the second requesting client device over the third unicast link.

10. The information processing system of claim 9, wherein the media streaming service is transmitted to the first requesting client device and the second requesting client device via the single multicast link over an air interface.

11. The information processing system of claim 9, wherein transmitting the media streaming service to the first requesting client device and the second requesting client device comprises notifying the first requesting client device and the second requesting client device to join a multicast group associated with the media streaming service.

12. The information processing system of claim 10, wherein the method further comprises:
based on transmitting the media streaming service to the first requesting client device and the second requesting client device via the single multicast link, disconnecting the second unicast link with the first requesting client.

13. The information processing system of claim 9, wherein the information processing system is communicatively coupled to at least one base station.

14. The information processing system of claim 9, wherein the multicast optimization threshold comprises a defined number of requesting client devices at least one of receiving and requesting the media streaming service, and is based on an availability of spectrum channel resources.

15. The information processing system of claim 9, wherein the method further comprises:
based on determining that the multicast optimization threshold has not been at least one of reached and exceeded:
- replicating the media streaming service being received from the content service provider over the first unicast link; and
- transmitting the media streaming service to the second requesting client device using a third unicast link, only the first unicast link for the media streaming service being established between the content service provider and the connection manager.

16. A computer program product tangibly embodying computer readable non-transitory instructions which, when implemented, cause a network node to carry out a method for optimizing content delivery in a network, the network node communicatively coupled between a plurality of client devices and at least one content service provider in the network, the method comprising:
- receiving a media streaming service from the content service provider over a first unicast link;
- transmitting the media streaming service to a first requesting client device in the plurality of client devices via a second unicast link;
- intercepting a request from a second requesting client device in the plurality of client devices for the media streaming service;
- determining if a multicast optimization threshold has been at least one of reached and exceeded based on the request from the second requesting device; and
- based on determining that the multicast optimization threshold has been at least one of reached and exceeded, transmitting the media streaming service to the first requesting client device and the second requesting client device via a single multicast link as the media streaming service is being received from the content service provider over the first unicast link:
  - after transmitting the media streaming service to the first requesting client device and the second requesting client device, determining, if the multicast optimization threshold is no longer at least one of reached and exceeded; and
  - based on determining that the multicast optimization threshold is no longer at least one of reached and exceeded:
    - re-establishing the second unicast link with the first requesting client device;
    - establishing a third unicast link with the second requestor device; and
    - transmitting the media streaming service to the first requesting client device over the second unicast link and transmitting the media streaming service to the second requesting client device over the third unicast link.

17. The computer program product of claim 16, wherein the media streaming service is transmitted to the first requesting client device and the requesting client requestor device via the single multicast link over an air interface.

18. The computer program product of claim 16, wherein transmitting the media streaming service to the first requesting client device and the second requesting client device comprises notifying the first requesting client device and the second requesting client device to join a multicast group associated with the media streaming service.

19. The computer program product of claim 18, wherein transmitting the media streaming service to the first requesting client device and the second requesting client device further comprises disconnecting the second unicast link with the first requesting client device.

20. The computer program product of claim 16, wherein the network node is communicatively coupled to at least one base station.

21. The computer program product of claim 16, wherein the multicast optimization threshold comprises a defined number of requesting client devices at least one of receiving and requesting the media streaming service, and is based on an availability of spectrum channel resources.

22. The computer program product of claim 16, wherein the method further comprises:
 based on determining that the multicast optimization threshold has not been at least one of reached and exceeded:
  replicating the media streaming service being received from the content service provider over the first unicast link; and
  transmitting the media streaming service to the second requesting client device using a third unicast link, only the first unicast link for the media streaming service being established between the content service provider and the network node.

* * * * *